(12) United States Patent
Lund et al.

(10) Patent No.: US 11,492,773 B2
(45) Date of Patent: Nov. 8, 2022

(54) METHOD FOR VIBRATION DAMPING OF AND VIBRATION DAMPER ASSEMBLY FOR SEMI-SUBMERGED OR SUBMERGED STRUCTURE

(71) Applicant: Momentum Technologies AS, Trondheim (NO)

(72) Inventors: Even Lund, Skatval (NO); Håvard Bjørkøy Johnsen, Ranheim (NO); Tomas Lundqvist, Trondheim (NO); Lina Ödlund, Malvik (NO)

(73) Assignee: Momentum Technologies AS, Trondheim (NO)

( * ) Notice: Subject to any disclaimer, the term of this patent is extended or adjusted under 35 U.S.C. 154(b) by 673 days.

(21) Appl. No.: 16/349,741

(22) PCT Filed: Mar. 6, 2018

(86) PCT No.: PCT/NO2018/050057
§ 371 (c)(1),
(2) Date: May 14, 2019

(87) PCT Pub. No.: WO2018/186746
PCT Pub. Date: Oct. 11, 2018

(65) Prior Publication Data
US 2019/0338482 A1 Nov. 7, 2019

(30) Foreign Application Priority Data
Apr. 7, 2017 (NO) .................................. 20170585

(51) Int. Cl.
*F16L 1/20* (2006.01)
*F16L 55/04* (2006.01)
(Continued)

(52) U.S. Cl.
CPC .......... *E02B 17/0017* (2013.01); *F16F 6/005* (2013.01); *F16F 7/08* (2013.01);
(Continued)

(58) Field of Classification Search
CPC ... F16L 1/123; F16L 1/163; F16L 1/20; F16L 1/24; F16L 55/04; F16L 55/041
(Continued)

(56) References Cited

U.S. PATENT DOCUMENTS 2,928,411 A * 3/1960 Johnson .................. F16L 58/00
138/147
3,454,051 A * 7/1969 Goepfert ................. F16L 1/123
174/42

(Continued)

FOREIGN PATENT DOCUMENTS

RU  2688566 C1 * 5/2019
SU  1707416 A1 * 1/1992 .............. F16L 55/04
(Continued)

OTHER PUBLICATIONS

International Search Report and Written Opinion dated Jun. 21, 2018 (PCT/NO2018/050057).

*Primary Examiner* — Frederick L Lagman
(74) *Attorney, Agent, or Firm* — Alix, Yale & Ristas, LLP

(57) ABSTRACT

Method for vibration damping of and vibration damper assembly for semi-submerged or submerged structure, based on separating hydrodynamic added mass from the semi-submerged or submerged structure by means of a vibration
(Continued)

damper assembly exhibiting spring and/or damper properties and use the hydrodynamic added mass as a reaction mass in the vibration damper assembly.

24 Claims, 33 Drawing Sheets

(51) Int. Cl.
    *E02B 17/00*     (2006.01)
    *F16F 6/00*     (2006.01)
    *F16F 7/08*     (2006.01)
    *F16F 7/10*     (2006.01)
    *F16F 7/104*     (2006.01)
    *F16F 13/00*     (2006.01)
    *F16L 1/12*     (2006.01)
    *F03D 13/25*     (2016.01)

(52) U.S. Cl.
    CPC ............ *F16F 7/104* (2013.01); *F16F 7/1034* (2013.01); *F16F 13/00* (2013.01); *F16L 1/123* (2013.01); *F16L 55/041* (2013.01); *F03D 13/25* (2016.05); *F05B 2260/964* (2013.01); *F16F 2222/04* (2013.01); *F16F 2222/06* (2013.01); *F16F 2222/08* (2013.01)

(58) Field of Classification Search
    USPC .............. 405/162, 171, 172, 211, 211.1, 216
    See application file for complete search history.

(56) References Cited

U.S. PATENT DOCUMENTS

| | | | |
|---|---|---|---|
| 4,439,070 A * | 3/1984 | Dimmick | E02D 5/64 24/271 |
| 5,226,751 A * | 7/1993 | Doleshal | E02D 5/60 405/211.1 |
| 5,591,265 A * | 1/1997 | Tusch | E02D 31/06 118/404 |
| 6,397,988 B1 | 6/2002 | Ptak | |
| 2009/0103984 A1* | 4/2009 | Zarisfi | F16L 1/201 137/236.1 |
| 2009/0185868 A1* | 7/2009 | Masters | F15D 1/10 405/211 |
| 2010/0215440 A1* | 8/2010 | Wajnikonis | B63B 22/18 405/211 |
| 2012/0103739 A1 | 5/2012 | Song et al. | |

FOREIGN PATENT DOCUMENTS

| | | | |
|---|---|---|---|
| SU | 1725003 A1 | | 4/1992 |
| WO | WO 95/27101 | * | 10/1995 |
| WO | 2015017792 A1 | | 2/2015 |

* cited by examiner

=

+

+

METHOD FOR VIBRATION DAMPING OF AND VIBRATION DAMPER ASSEMBLY FOR SEMI-SUBMERGED OR SUBMERGED STRUCTURE

The disclosure is related to a method for vibration damping of semi-submerged or submerged structure.

The disclosure is also related to a vibration damper assembly for semi-submerged or submerged structure.

More particularly, the disclosed embodiments relate to a method for vibration damping of and vibration damper assembly for semi-submerged or submerged structure utilizing hydrodynamic mass, that all semi-submerged or submerged structures are experiencing, to reduce vibration and thus reduce the chances of fatigue failure thereof.

BACKGROUND

Many marine structures, both submerged and semi-submerged, are experiencing problems with dynamic motion, shock and vibration causing fatigue. The oil and gas industry is extending the life of old reservoirs, increasing the flow velocity in old pipelines that are beyond their original expiry date. This is increasing the chances of leaks of hydrocarbons to happen, creating great production losses, large environmental spills, repair costs and the risk of losing lives.

Vibration and fatigue are not only related to the oil and gas industry, and it is likely that other renewable energy structures, such as wind power or tidal power, ships and fish farms, to name a few, are experiencing many of the same problems.

Marine structures can be subjected to many types of dynamic forces: semi-submerged structures can have wind, wave and current loads. Submerged pipelines can also experience internal forces transferred through the structure from machinery or created from fluids flowing through the pipes or acoustics in the pipe.

Common for many of the marine structures is that it is difficult to inspect and maintain systems under water. Marine structures thus need to be robust and usually require a lifetime beyond 20 years. Within this time frame the structure must withstand vibration caused by all the dynamic forces it is subjected to.

There are a great number of different techniques available for controlling vibration. They can be sorted in active systems or passive systems.

Active systems use energy to reduce vibration and are usually having an electronic vibration controller that use feedforward and/or feedback to control an actuator that is counteracting the motion. Passive damping systems are utilizing friction, viscous losses or magnetic or other types of losses to dissipate energy without using external power.

It is not known that active systems have been used under water in the past, and passive vibration systems are also rarely used for subsea systems.

Examples of such systems are viscous dampers and reaction mass dampers which can act in one or more axes. The viscous damper is the fundamental building block in mechanical lumped element models and has two connection points where usually the vibrating structure is connected to one end and a foundation to the other end. A dash pot or shock absorber for a car is behaving like a viscous damper.

Reaction mass dampers use the inertia of a secondary mass to counteract the motion of the vibrating structure. Both passive and active systems exist. The passive systems are known as tuned mass dampers, harmonic absorbers, tuned absorbers or Lanchester dampers. The reaction mass for a passive system is connected to the vibrating structure trough spring and damper elements to create a reaction force. A combination of dissipation and transferal of mechanical energy is used to reduce the vibration in the main system.

For submerged applications the prior art solutions suffer from that they do not work for low frequencies.

The solutions of prior art further suffer from that they are only capable of damping vibrations within a relatively narrow frequency range.

Prior art solutions further suffer from that they require arrangement to a foundation, at one side thereof.

A disadvantage with prior art is further that, if more than one damping system is used, they will interact/counteract the function of each other.

A further disadvantage with the prior art solutions is that they introduce large gravitational loads to the structure.

Prior art solutions further suffer from that they either work in vertical or horizontal direction under water, and is arranged for damping either transient or harmonic forces.

A further disadvantage with prior art is that they comprise many mechanical parts exposed to wear.

Another disadvantage with prior art reaction mass dampers is that they are arranged for reducing the mechanical response, but are not arranged for handling external forces, i.e. forces from the environment.

SUMMARY OF THE INVENTION

Provided herein is a method for vibration damping of and vibration damper assembly for semi-submerged or submerged structures partly or entirely solving the drawbacks of prior art.

Also provided is a method for vibration damping of and vibration damper assembly for semi-submerged or submerged structure utilizing hydrodynamic mass to reduce vibration in the semi-submerged or submerged structure.

Also provided is a method for vibration damping of and vibration damper assembly for semi-submerged or submerged structure capable of separating the hydrodynamic added mass from the semi-submerged or submerged structure by means of at least one spring element and/or damper element.

Also provided is a method for vibration damping of and vibration damper assembly for semi-submerged or submerged structure realized as a tuned mass damper or tuned absorber, or as a Lanchester damper.

Also provided is a method for vibration damping of and vibration damper assembly for semi-submerged or submerged structure capable of vibration reduction over a wide range of frequencies.

Also provided is a method for vibration damping of and vibration damper assembly for semi-submerged or submerged structure also working for low frequencies.

Also provided is a method for vibration damping of and vibration damper assembly for semi-submerged or submerged structure which require no foundation.

Also provided is a method for vibration damping of and vibration damper assembly for semi-submerged or submerged structure which do not interact/counteract the function of other damping systems used in connection with the semi-submerged or submerged structure the vibration damper assembly according to the present invention is arranged to.

Also provided is a method for vibration damping of and vibration damper assembly for semi-submerged or submerged structure having great vibration reduction abilities due to large mass ratios subsea.

Also provided is a method for vibration damping of and vibration damper assembly for semi-submerged or submerged structure that does not introduce large gravitational loads to the semi-submerged or submerged structure.

Also provided is a method for vibration damping of and vibration damper assembly for semi-submerged or submerged structure working both in vertical and horizontal direction under water.

Also provided is a method for vibration damping of and vibration damper assembly for semi-submerged or submerged structure that can be implemented with few mechanical elements providing a robust design.

Also provided is a method for vibration damping of and vibration damper assembly for semi-submerged or submerged structure working for both transient and harmonic forces.

Also provided is a method for vibration damping of and vibration damper assembly for semi-submerged or submerged structure capable of mitigating the mechanical response induced by both internal and external forces.

Also provided is a method for vibration damping of and vibration damper assembly for semi-submerged or submerged structure that can be implemented as an active or passive vibration damper assembly.

Also provided is a vibration damper assembly which in addition to the above objects also can provide buoyancy for a semi-submerged or submerged structure.

Also provided is a method for damping of and vibration damper assembly for semi-submerged or submerged structure that is scalable.

Also provided is a method for damping of and vibration damper assembly which reduces vibration in six degrees of freedom, which effectively reduces the number of dampers necessary to a given vibration problem.

The disclosed embodiments simplify and enhance the robustness of the tuning process of the vibration damper assembly.

It is difficult to understand the complex motion of a vibrating structure just by observing it by the eye, as shown in FIG. 1 which is a principle drawing of a vibrating elongated structure and frequency response (time domain in air) thereof. It is though well known that this motion can be described as a superposition of multiple single frequency motions known as eigenmodes/natural modes, as indicated in FIG. 2 showing eigenmodes for the vibrating elongated structure in FIG. 1. When a force with a single frequency, is corresponding to the eigenfrequency/natural frequency of the eigenmode, you get resonance, a large amplification of the vibration at positions where the eigenmodes have large motion, known as antinodes. The vibration for this particular eigenmode will be lower for all other forcing frequencies than the vibration at the eigenfrequency, as e.g. as illustrated in FIG. 3 for the vibrating elongated structure in FIGS. 1 and 2. The observed vibration for a given elongated structure will be the sum of motion from all eigenmodes. The frequency spectrum for a point along the elongated structure will further be given by the sum of the spectra for each eigenmode.

It is further known, that when observing a point along the vibrating elongated structure, the motion of each of the eigenmodes can be mathematically described as a lumped mass system given by an equivalent mass $m_{eq}$, a spring k and damper c, as illustrated in FIG. 4 which is a principle drawing of a lumped mass system. The equivalent lumped parameters can be extracted from the continuous system through measurement or simulation.

The vibratory response for this simple one-degree-of freedom system, when the mass is subjected to a harmonic vertical force, is given by:

$$x = \frac{F}{k - m_{eq}\omega^2 + j\omega c}$$

where x is the vibration amplitude, F is the harmonic force amplitude, k is the stiffness coefficient, $m_{eq}$ is the mass, c is the damping coefficient, w is the rotational frequency and j is the imaginary unit for a complex number.

The amplitude of the vibration is given by:

$$|x| = \frac{F}{\sqrt{(k - m_{eq}\omega^2)^2 - (\omega c)^2}}$$

The vibratory response for this system will in theory go to infinity if the damping coefficient is zero and the forcing frequency is $$\omega = 2\pi f = \sqrt{\frac{k}{m_{eq}}},$$

where ω is the angular frequency [rad/s] and f is the frequency [Hz]. This is known as resonance. It is also worth noting that the system rarely will experience resonance if the stiffness coefficient is zero given that the $c/m_{eq}$ ratio is sufficiently low, such as a system consisting of only a mass and a damper.

When the same continuous vibrating elongated structure is submerged in a liquid, such as water, it is known that the structural dynamics will change due to the interaction with the liquid. This field of dynamics is known as hydrodynamics.

The continuous system can be broken down to a similar set of mode shapes and the full response can be described as a superposition of the modes, similar to that of the elongated structure in air (FIG. 2). The response at a point along the elongated structure can also be broken down to a superposition of the responses for each eigenmode as lumped mass representations with given frequency spectra. The main difference to air being that the hydrodynamic effects will change the parameters of the models. For a low viscous liquid, such as water, the additional damping coefficient will be negligible compared to in air. The additional mass will, on the other hand, be quite large for an elongated structure submerged in water. This additional mass is known as added mass, or hydrodynamic added mass and can be thought of as an additional mass layer surrounding the elongated structure when it is vibrating in water, as illustrated in FIG. 5 which is a principle drawing of a pipe dynamic model.

The lumped mass representation for a point along the elongated structure can be represented as the original representation with a mass added, connected directly to the formerly described equivalent mass, as illustrated in FIG. 6 which is a principle drawing of a submerged lumped mass system.

The hydrodynamic added mass effect of liquid is troublesome for structures susceptible of vibration. The vibratory response will be higher and it will be more difficult to suppress the vibration through mitigating techniques. The former can be seen in the expression for the point response for each eigenmode: where $$x = \frac{F}{k - (m_{eq} + m_{add})\omega^2 + j\omega c},$$

$m_{eq}$ is the equivalent structural mass and $m_{add}$ is the hydrodynamic mass. The denominator will shrink as the $m_{add}$ is being increased, thus increasing the vibration amplitude x.

Provided herein is a method and vibration damper assembly (Hydro Hook Support vibration damper assembly) which utilize the hydrodynamic added mass as a reaction mass in a vibration damper assembly exhibiting spring and/or damper properties.

The term structure used in the further description includes besides main structures, extension of a structure, support structure for a structure, or vibration damper support structure used for arranging a vibration damper assembly to a structure, extension of a structure, or support structure for a structure.

The method and vibration damper assembly according to the disclosure is based on separating hydrodynamic added mass from the semi-submerged or submerged structure by means of at least one spring element and/or damper element. In this way it is possible to use the hydrodynamic added mass as a reaction mass in a vibration damper assembly, as illustrated in FIG. 7 which is a principle drawing of the main principle of a vibration damper assembly according to the disclosure. This change converts the hydrodynamic added mass from being a problem to benefiting from its use, hence it enables well known damping technologies to be implemented and customized for usage underwater.

Accordingly, the method and vibration damper assembly according to the disclosure are arranged to separate the hydrodynamic added mass from the semi-submerged or submerged structure by means of at least one spring element, at least one damping element or a combination of these arranged in a damper volume partly or entirely enclosing the structure, wherein the damper volume is provided by an outer cover.

A vibration damper assembly comprising a spring element, with or without damper element, for separating the hydrodynamic added mass, can be recognized as a tuned mass damper (TMD) or tuned absorber, as illustrated in FIG. 8 which is a principle drawing of an embodiment of the disclosed vibration damper assembly. If the vibration damper assembly only comprises at least one damping element it can be recognized as a Lanchester damper, as illustrated in FIG. 9 which is a principle drawing of an embodiment of a vibration damper assembly.

Tuned mass dampers, in particular, have been used in many applications from tall buildings, bridges, power lines, cars and planes, to reduce resonant vibration.

The vibration damper assembly according to the embodiments described above do not require any foundation, compared to a viscous damper or a dash pot type of damper that requires the two ends of the damper to be attached to a moving and rigid part respectively. Further, the vibration damper assembly, as described above, provides significant vibration reduction over a wide range of frequencies compared to the undamped response, if the consisting parameters ($m_{add}$, add, c and k) are correctly tuned/set up according to the vibrating structure in question.

The main advantage of the disclosed method and vibration damper assembly in the form of a tuned mass damper is that the vibration reduction for a given mass ratio, $\mu=m_{add}/m_{eq}$, will be larger than for a method and vibration damper assembly in the form of a Lanchester damper, especially for low mass ratios. The mass ratio for the disclosed embodiments will in almost any circumstance be above 1, which is very large compared to most other structures and applications where reaction mass dampers (TMDs or Lanchester) have been used. The performance of the method and vibration damper assembly in the form of a Lanchester damper will converge towards the performance of a TMD with high mass ratios.

Hence, Lanchester damper refers to a reaction mass damper without spring element damping rotational vibration/movement in up to three degrees of freedom, the disclosed embodiments amount to a novel damping method; a reaction mass damper without spring element, that provide damping in six degrees of freedom by a vibration damper (Hydro Hook Support (HHS) vibration damper).

Accordingly, the disclosure provides a method and vibration damper assembly utilizing the hydrodynamic mass in a reaction mass damper. The disclosed method and vibration damper assembly have many advantages that other conventional dampers do not have.

The main advantage of the method and vibration damper assembly is that the vibration damper assembly can be set up without eigenfrequencies, which will accommodate the detrimental interaction effects that multiple TMDs can have on a vibrating structure and that will affect the function of other dampers as well. This means that engineering of a vibration damper assembly according to the present invention will be easier than with TMD, as the function will be nearly guaranteed as long as the vibration damper assembly is arranged to a part of the structure that is vibrating. This also means that a fewer number of vibration damper assemblies are necessary in order to reduce vibrations down to acceptable levels.

Provided is a method and vibration damper assembly providing a solution working for low frequencies. This will be favourable as the most subsea application problems are related to low frequencies and lack of foundation for attaching a viscous damper at two ends.

An advantage of the method and vibration damper assembly is that it is capable of damping vibrations for a wide frequency range.

It is further a considerable advantage of the method and vibration damper assembly that no foundation is required.

A further advantage over prior art is that it is not interacting/counteracting the function of other damping systems used in connection with the structure the vibration damper assembly according to the present invention is arranged to.

It is further an advantage that the method and vibration damper assembly have great vibration reduction abilities due to large mass ratios subsea.

An advantage over prior art is that the disclosed embodiments do not introduce large gravitational loads to the semi-submerged or submerged structure.

It is further a considerable advantage with the method and vibration damper assembly that it is working both in vertical and horizontal direction under water.

A further advantage is that the method and vibration damper assembly can be implemented with few mechanical elements providing a robust design.

It is further an advantage that the method and the vibration damper assembly work for both transient and harmonic forces.

A considerable advantage with the method and vibration damper assembly is further the capability to mitigate the mechanical response induced by both internal and external forces.

A further advantage of the method and vibration damper assembly is that the vibration damper assembly can be implemented both as an active or passive vibration damper assembly. For underwater/submerged application, it will often be preferred to use a passive vibration damper assembly due to the harsh environment and no need for external powering.

A considerable advantage is that is not only related to radial movement, but will also work axially, in rotation about the longitudinal axis (torsion) of the semi-submerged or submerged structure and tilting around the longitudinal axis of the semi-submerged or submerged structure. Accordingly, provided is a method and vibration damper assembly with six degrees of freedom.

An advantage of the vibration damper assembly is further that it can be divided in segments enabling it to be retrofitted to existing semi-submerged or submerged structures.

Another advantage is that it introduces low amount of static drag, which is a known problem for semi-submerged and submerged structures.

It is further a considerable advantage is that the disclosed embodiments are capable of absorbing harmonic and transient stress (vibrations and slugs).

Another advantage is that the disclosed embodiments further work on both linear and nonlinear structures.

An advantage is further that the disclosed embodiments provide a scalable solution enabling it to be easily adapted to anything from small/short structures to very large/long structures.

It is further an advantage of the disclosed embodiments that they can be used for replacing other mechanism used on semi-submerged or submerged structures for Vortex Induced Vibration (VIV), as helical strakes and fairings.

An advantage is that it can be implemented adjustable if desired or requested.

It is further an advantage that it provides a plain and cost effective solution for implementation to a semi-submerged or submerged structure.

BRIEF DESCRIPTION OF THE DRAWINGS

The present invention will below be described in further detail with references to the attached drawings, where.

DETAILED DESCRIPTION

A vibration damper assembly 100 (Hydro Hook Support vibration damper assembly) according to the disclosure can be realized through many different types of designs, which will be described below.

Reaction mass, $m_{add}$ can be realized by that the vibration damper assembly 100 comprises an outer cover 110 arranged to partly or entirely enclose a part or section of a structure 200, 210, 220, 300.

Figure 20A:
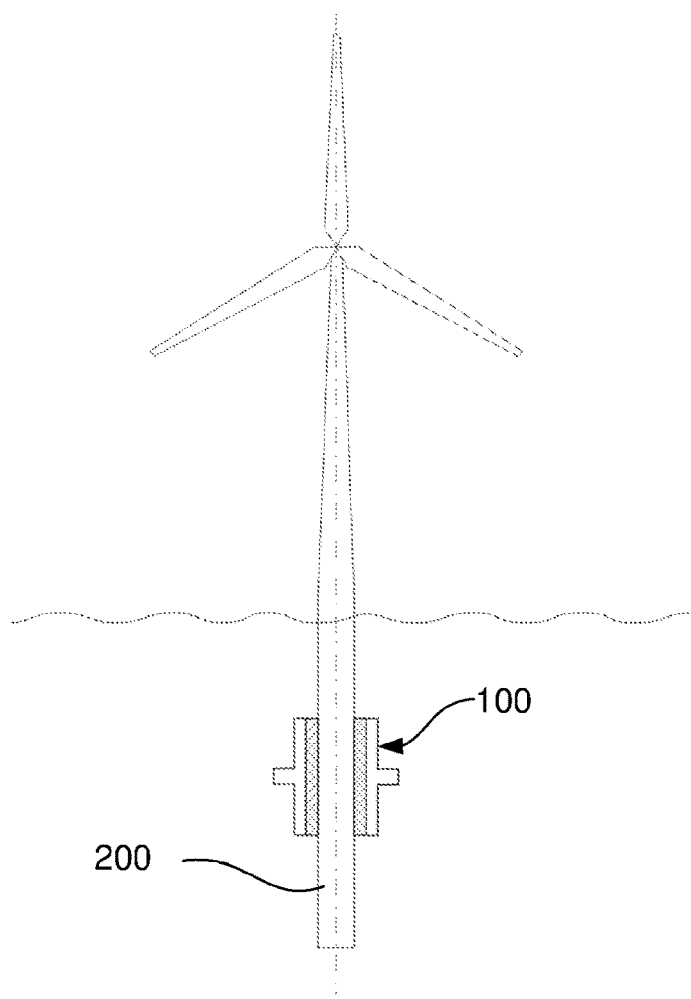
FIG. 20a-e are principle drawings of structures with the vibration damper assembly arranged thereto.
Figure 20B:
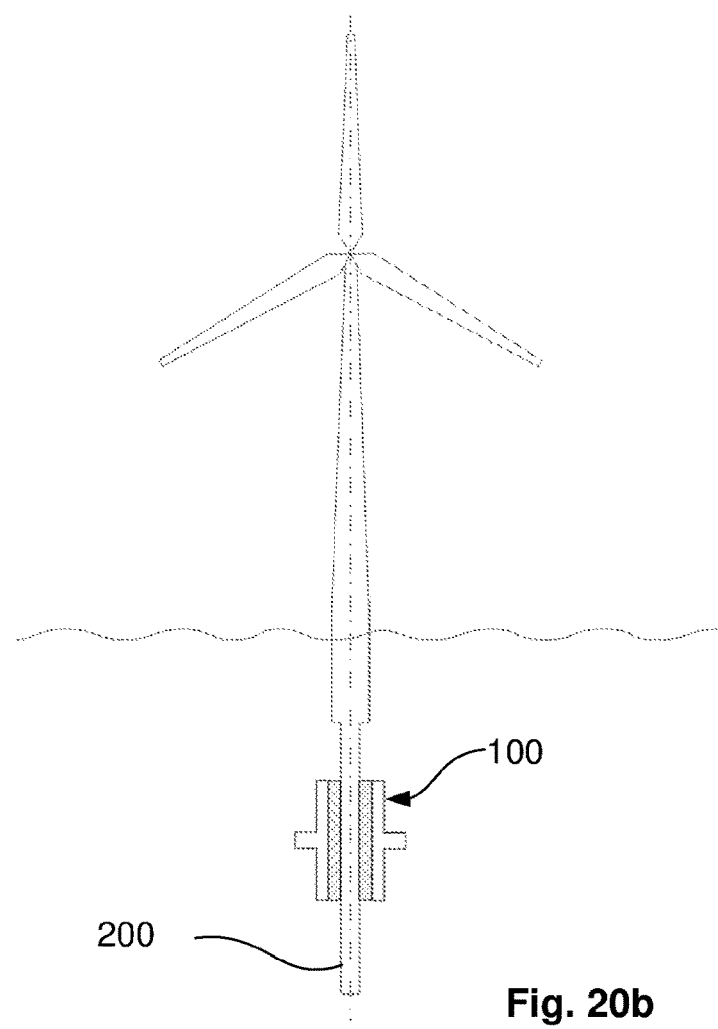
Figure 20C:
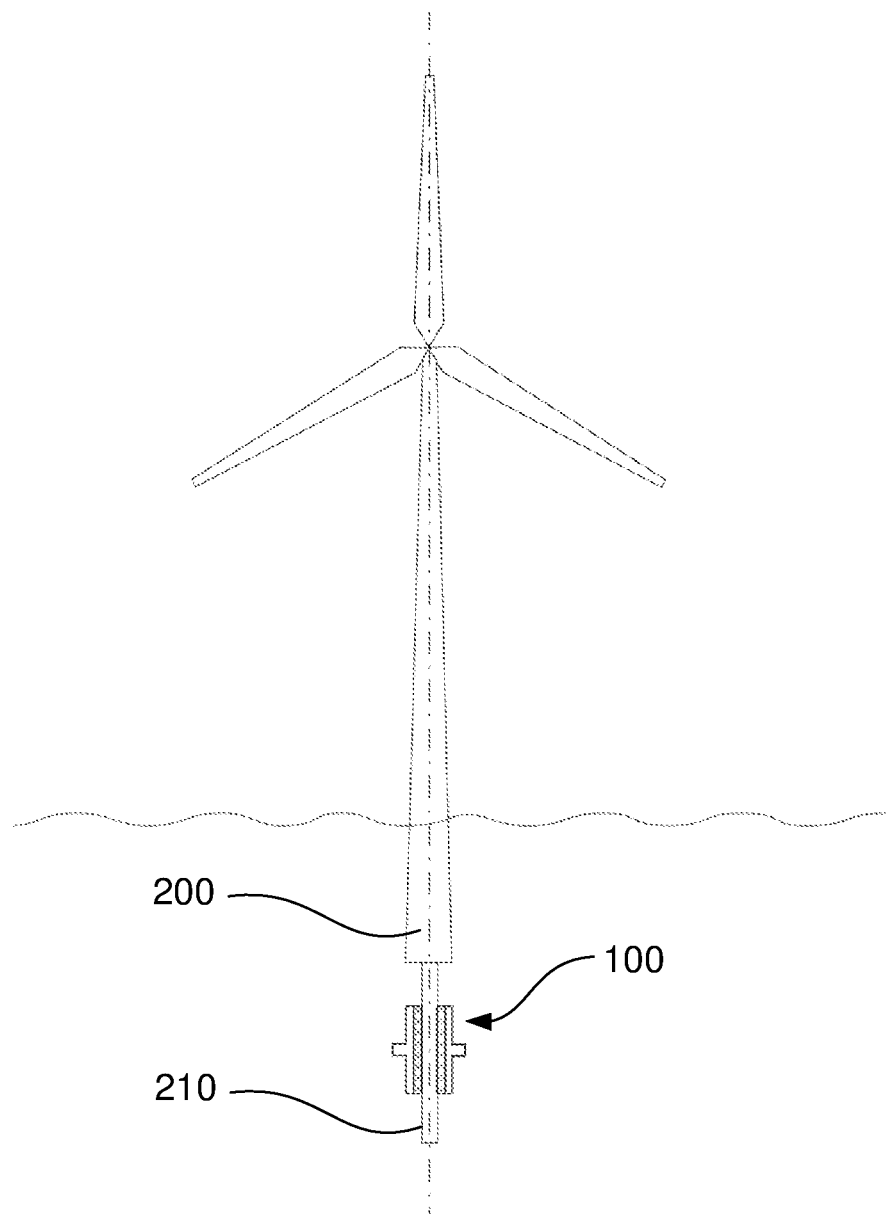
Figure 20D:
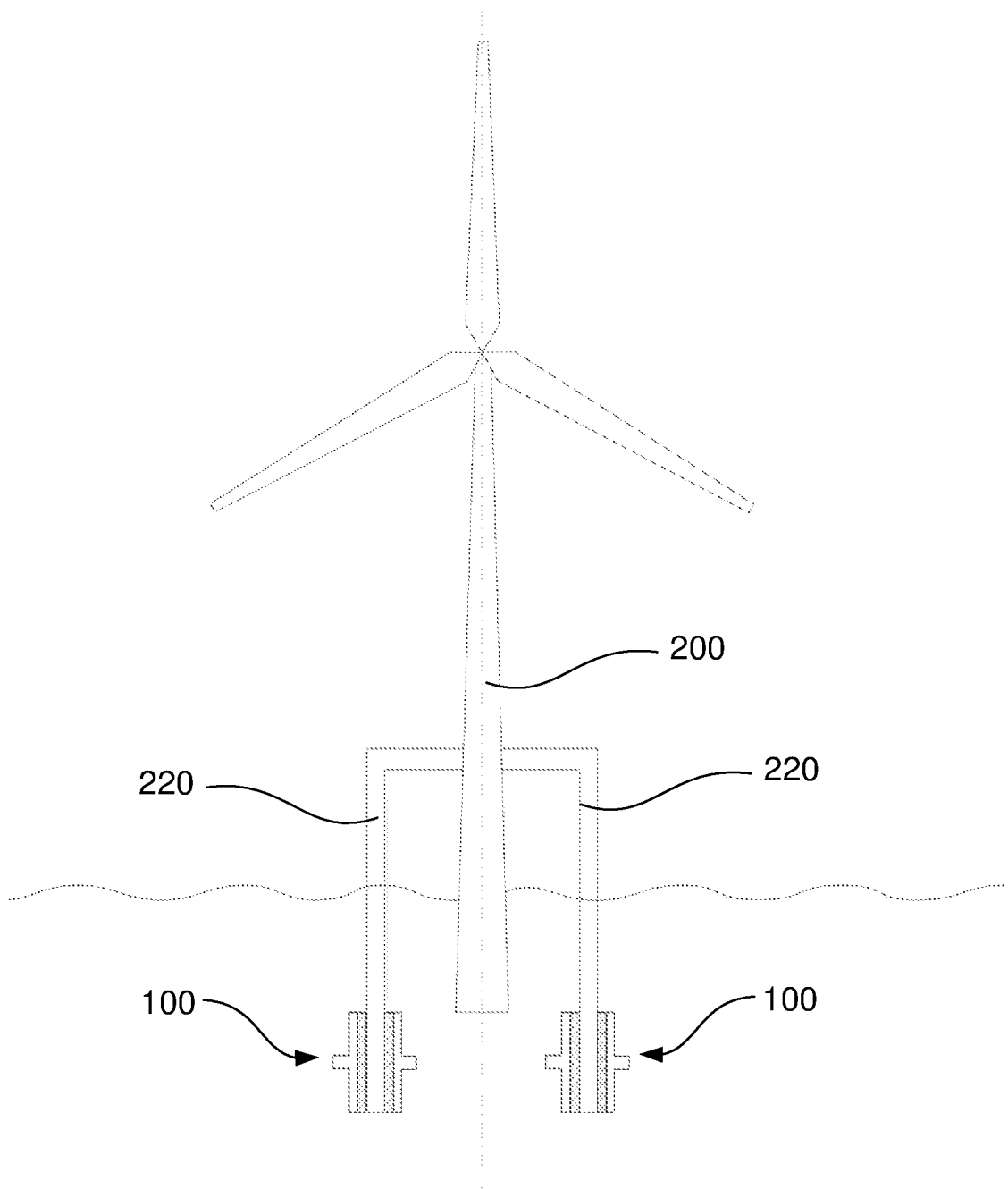
Figure 20E:
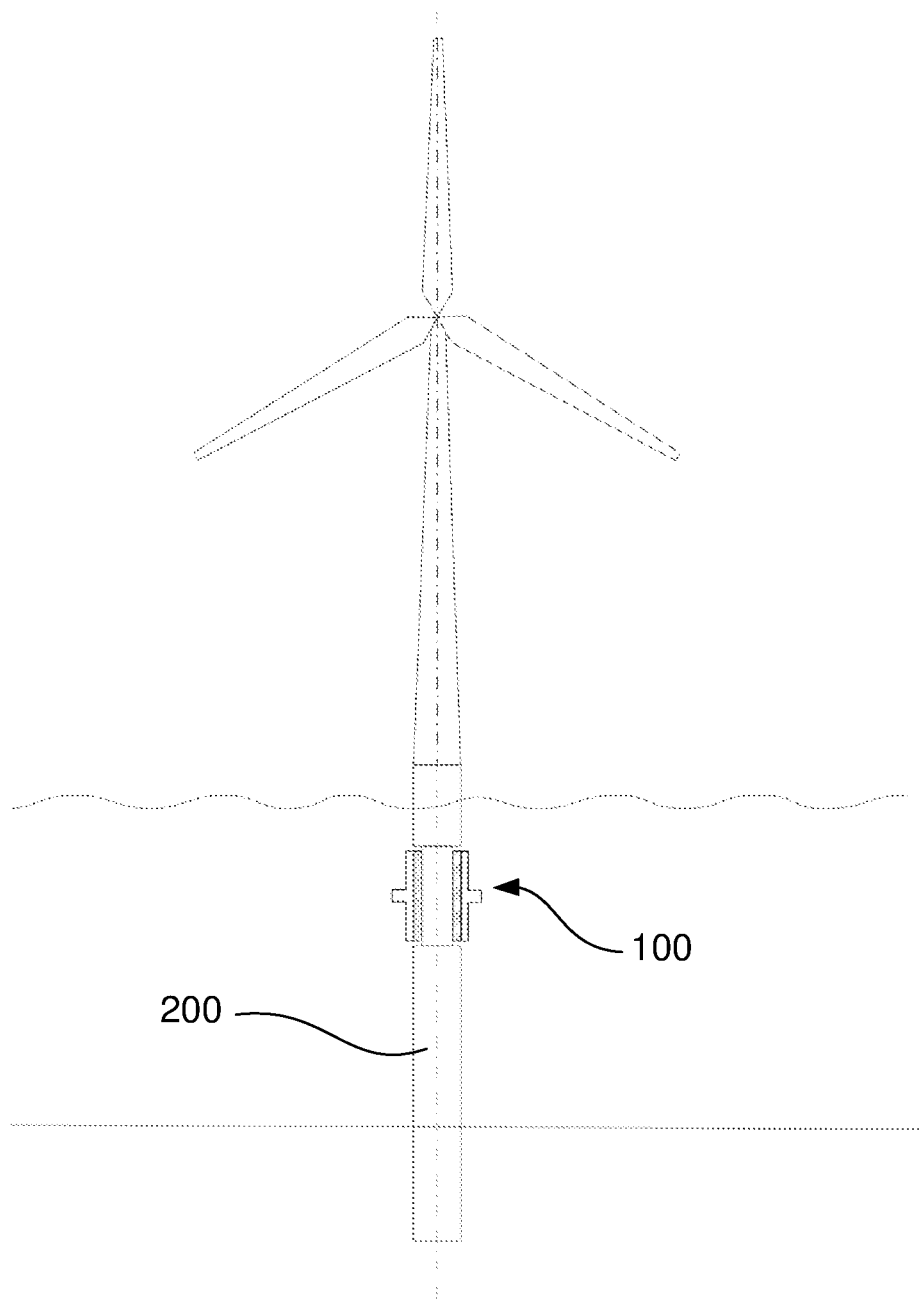
Figure 26:
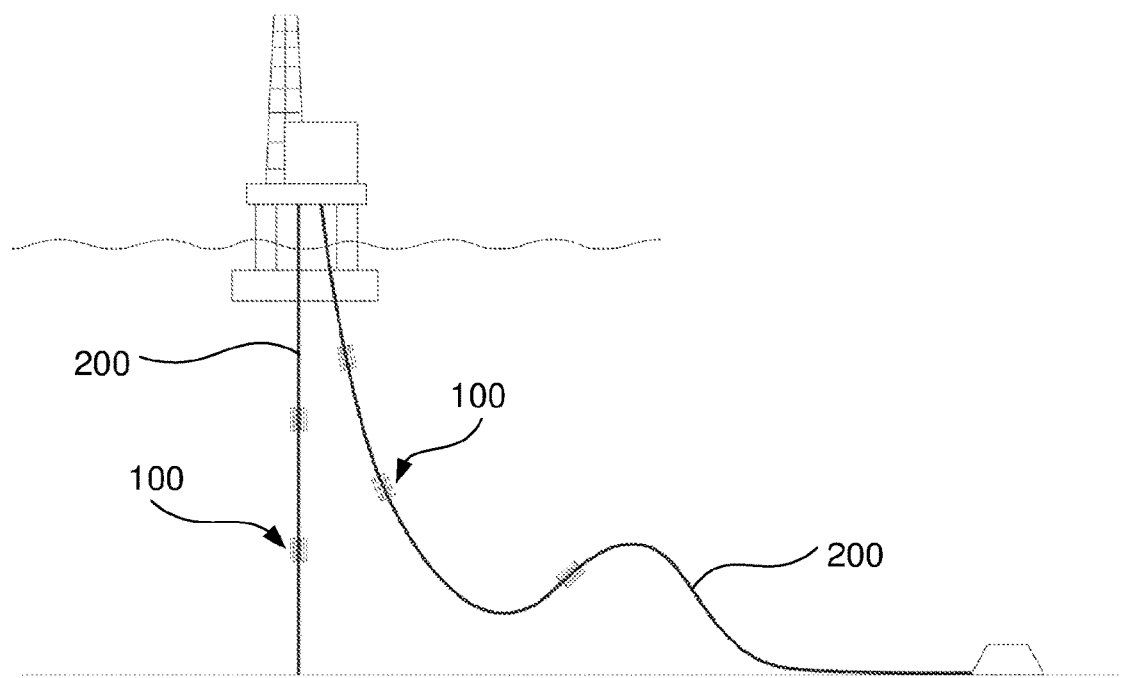
FIG. 26-28 are principle drawings of vibration damper assembly arranged to a structure.

A structure 200 according to the disclosure will typically be pipelines for subsea use in the oil and gas industry, such as SCRs, (stiff or flexible) risers (as shown in FIG. 26) (export, drilling, production), jumpers, flexloops, export and transport pipelines and tubing are some examples. Other examples of structures 200 are protruding valves. Yet other examples of structures 200 can be support structures 220 or structural members (e.g. beams or rods) of a semi-submerged or submerged offshore installation, as shown in FIGS. 20a-b. The use of the vibration damper assembly 100 on an extension 210 of a structure 200 is shown in FIG. 20c, and an example of the arrangement of vibration damper assemblies 100 to support structure 220 is shown in FIG. 20d. In FIG. 20e is shown an example of arrangement of a vibration damper assembly 100 according to the disclosure as an integrated design of the structure 200.

A structure can further be a vibration damper support structure 300. The vibration damper support structure 300 is a solid structure that can be used to arrange the vibration damper assembly 100 exterior/remotely of the structure 200, 210, 220 to be dampened and which will transfer vibrations from the structure 200, 210, 220 to the vibration damper assembly 100, as will be discussed in FIGS. 21a-b, 22a-c and 23a-b.

The term structure will below be used for main structures 200, extension 210 of structures, support structures 220 for structures, as well as vibration damper support structures 300.

These are only a few examples of structures 200, 210, 220, 300 which the inventive embodiments are applicable for, and further examples will be discussed below.

The further example description will mainly be related to an elongated mainly tubular structure 200, such as a pipe, pipeline, tube or tubing, cable or cable assembly, wire, chain, etc., but the present invention is not limited to elongated tubular structures, as will be discussed below.

The outer cover 110 exhibits an outer circumference being larger than the structure 200, 210, 220, 300 and is arranged to surround the part or section of the structure 200, 210, 220, 300 in a circumferential direction thereof. The outer cover 110 will further exhibit a length in longitudinal direction of the part or section of the structure 200, 210, 220, 300 to provide a damper volume 111 between outer surface of the part or section of the structure 200, 210, 220, 300 and inner circumference of the outer cover 110.

The outer cover 110 will thus provide an enclosure around a part/section of the structure 200, 210, 220, 300, but can in some embodiments enclose mainly the entire structure 200, 210, 220, 300. The following sections of the description will mainly be related to an outer cover 110 enclosing a part/section of an elongated structure 200, 210, 220, 300 but other alternatives will also be described.

The outer cover 110 can further be provided with seals 112 at ends thereof, sealing against the structure 200, 210, 220, 300 and providing a sealed damper volume 111 that is separated from the water surrounding the structure 200, 210, 220, 300. The seals 112 can e.g. be rubber bellows, sleeves, gaskets, seals or similar, but can also be more sophisticated/advanced mechanical solutions, which will be apparent for a skilled person.

Figure 19A:
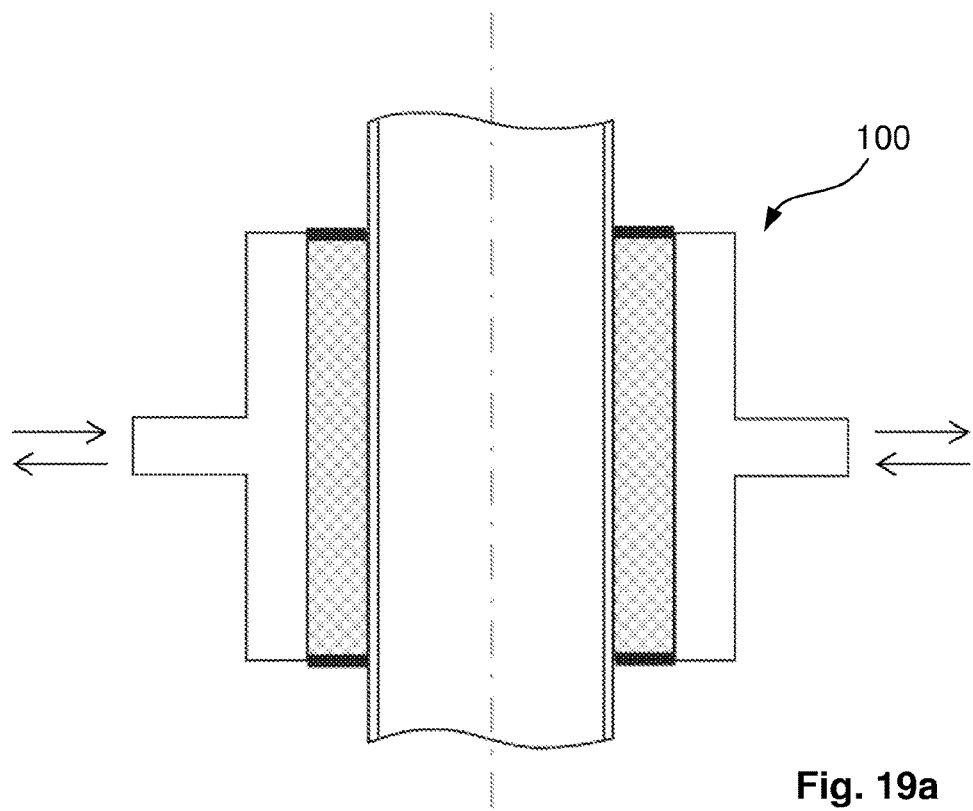
FIG. 19a-d are principle drawings of the hydrodynamic added mass created in all six degrees of freedom.
Figure 19B:
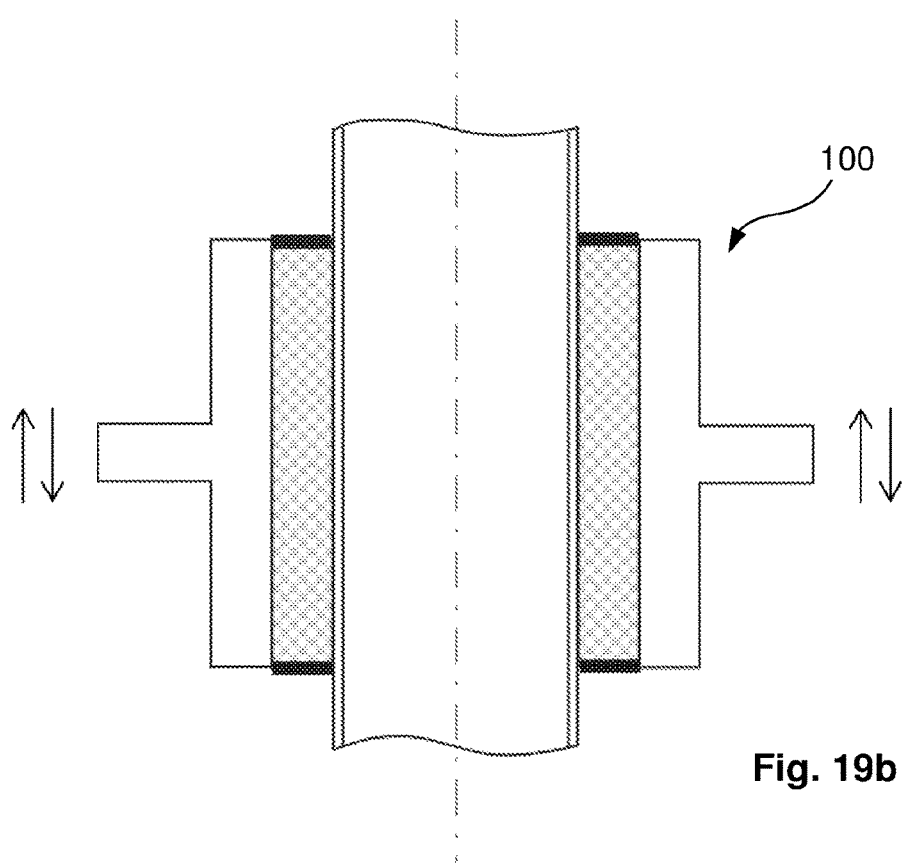
Figure 19C:
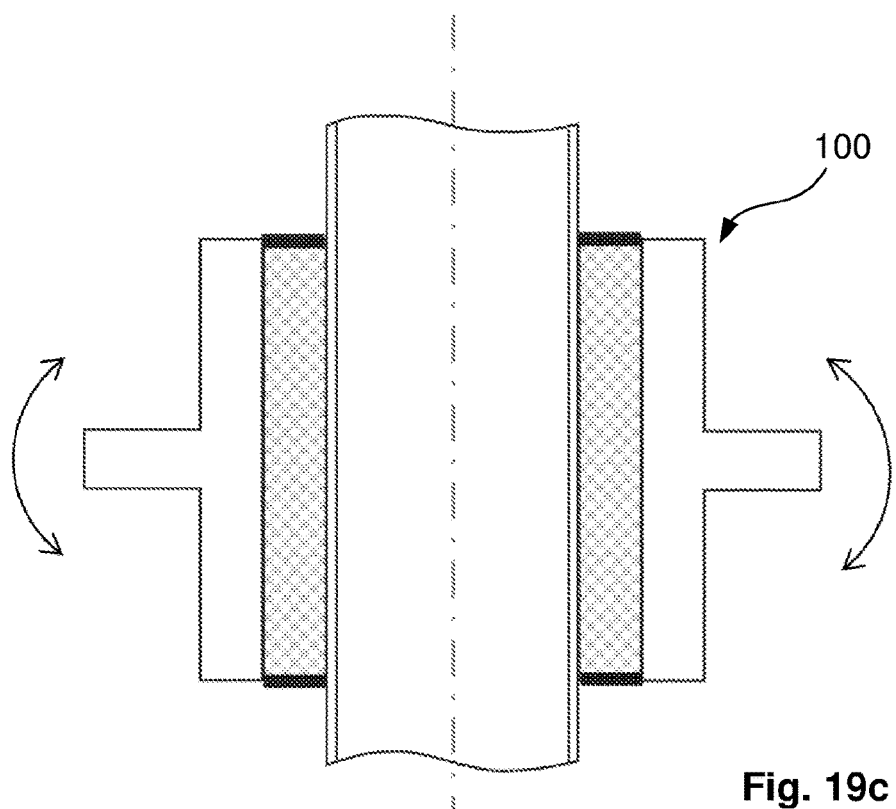
Figure 19D:
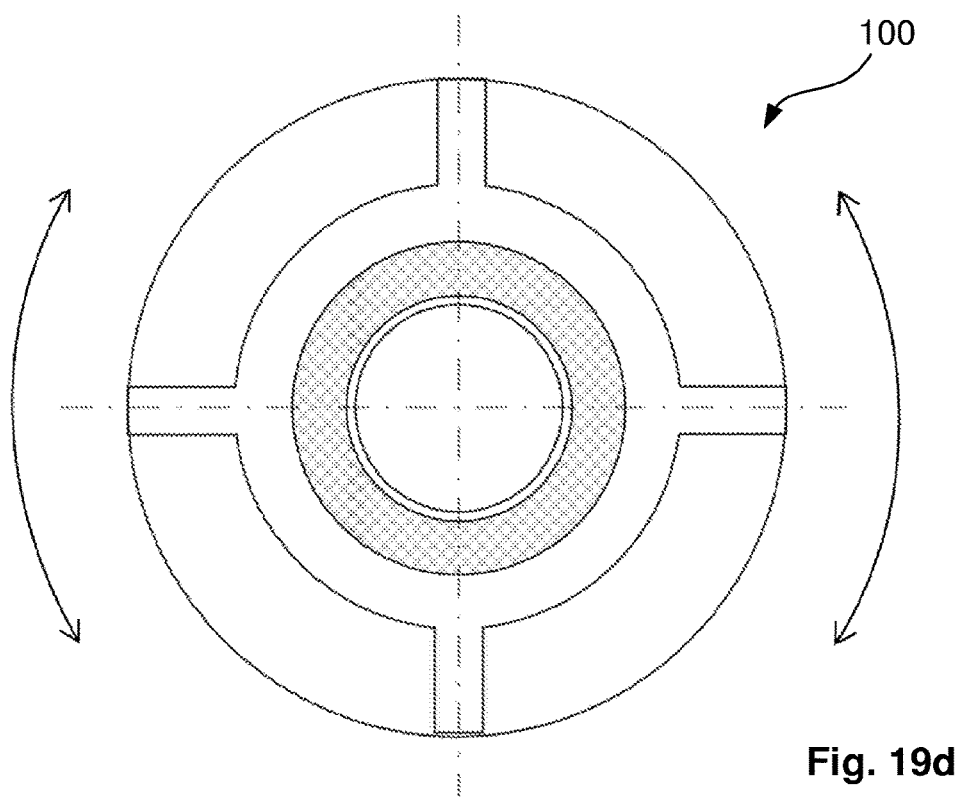

The hydrodynamic added mass or added inertia is accordingly created in all six degrees of freedom for the outer cover 110 (reaction mass), as shown in FIGS. 19a-d. Three translational degrees axial (FIG. 19b)+2×lateral (FIG. 19a), three rotational torsional (FIG. 19d)+2×rocking (FIG. 19c).

Figure 10A:
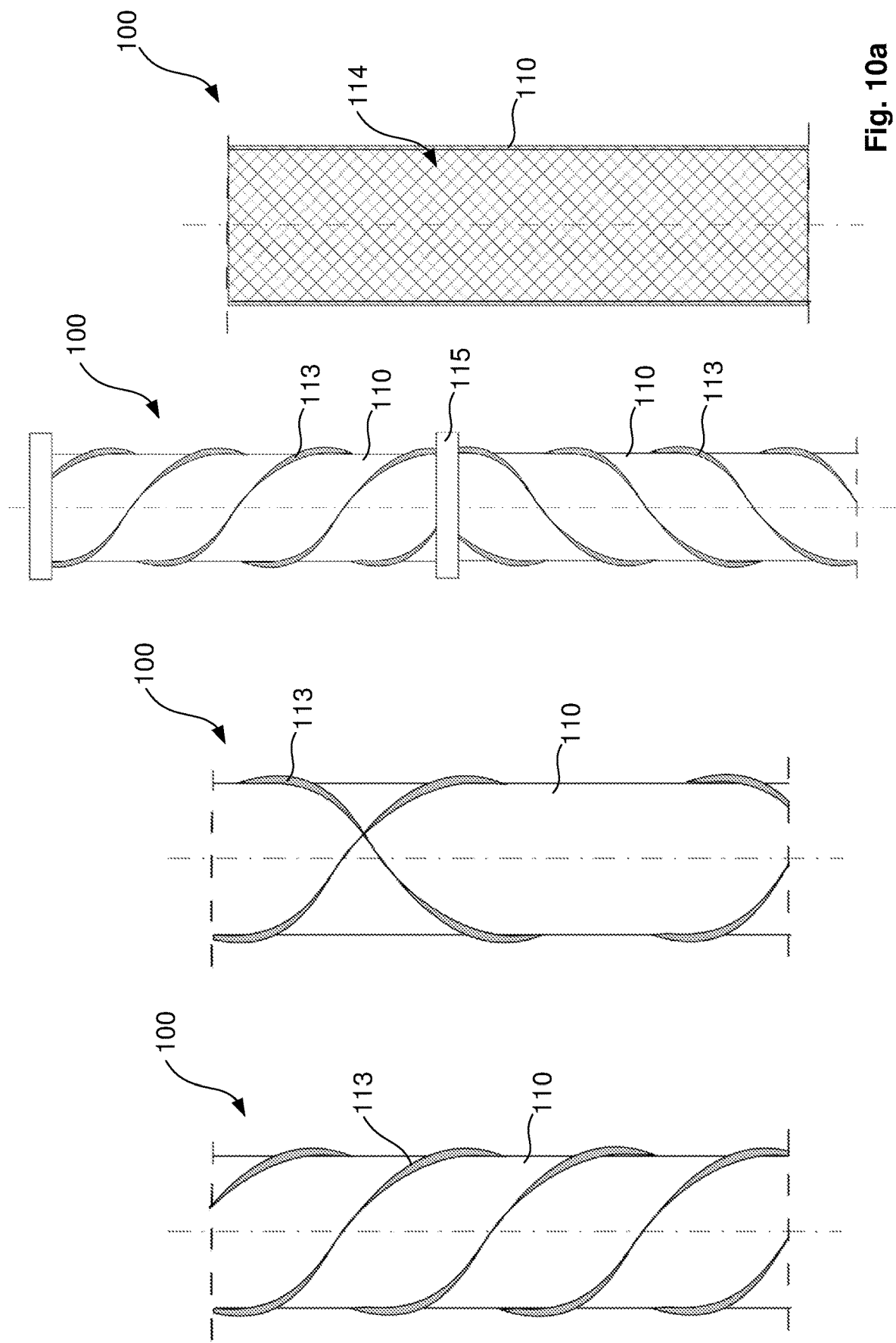
FIG. 10a-b are principle drawings of examples of outer cover for the disclosed vibration damper assembly.
Figure 10B:
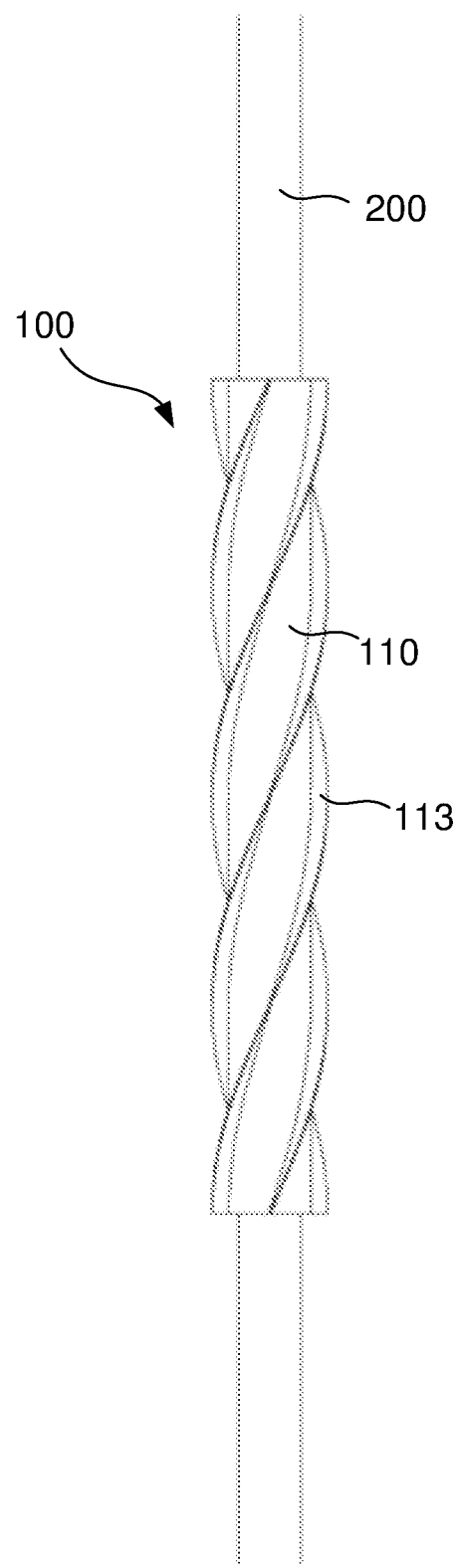

Reference is now made to FIGS. 10a-b showing examples of outer cover 110 for the vibration damper assembly 100 according to the disclosure. The design of the outer cover 110 can be everything from a simple cylindrical cover, to more advanced designs involving fins 113, grids 114, spacers 115 or other designs arranged to, in addition to being an outer cover, provide secondary effects to the vibration damper assembly 100, namely reduction of vortex shedding and vibration due to external forcing, such as Vortex Induced Vibrations (VIV).

It is important that the geometry/design of the outer cover 110 being used has the minimum static drag coefficient possible, but the maximum dynamic drag coefficient. High static forces are created when the static drag coefficient is high, which is a common problem for submerged structures 200, 210, 220, 300 with strong water current passing by. Accordingly, by means of the shown designs of the outer cover 110, the static drag is kept at a minimum. High hydrodynamic masses are created when the dynamic drag coefficient is high, as required by the damper mass and preferred to reach high performance. Calculations made by the applicant show that four small fins 113, extending mainly perpendicular to one another out from the outer cover 110 around the circumference, will create a hydrodynamic mass that is approximately 1.4 times the hydrodynamic mass for a cylinder with the same outer diameter.

It should be mentioned that the shown alternatives of the outer cover 110 are only example embodiments and that the outer cover 110 can vary from this, e.g. by that the fins 113 have different shape and size and the number of fins 113 can be both higher and lower than in the shown embodiments.

Further, the damper volume 111 can be filled with a material with lower density than the ambient liquid (water in the example), thus giving buoyancy to structure 200, 210, 220, 300 requiring neutral or positive buoyancy. According to the disclosure also existing buoyancy elements (not shown) of a structure 200, 210, 220, 300 can form the basis of the inventive embodiments or that the vibration damper assembly 100 is used in combination with buoyancy elements (not shown) of the structure 200, 210, 220, 300.

Figure 16A:
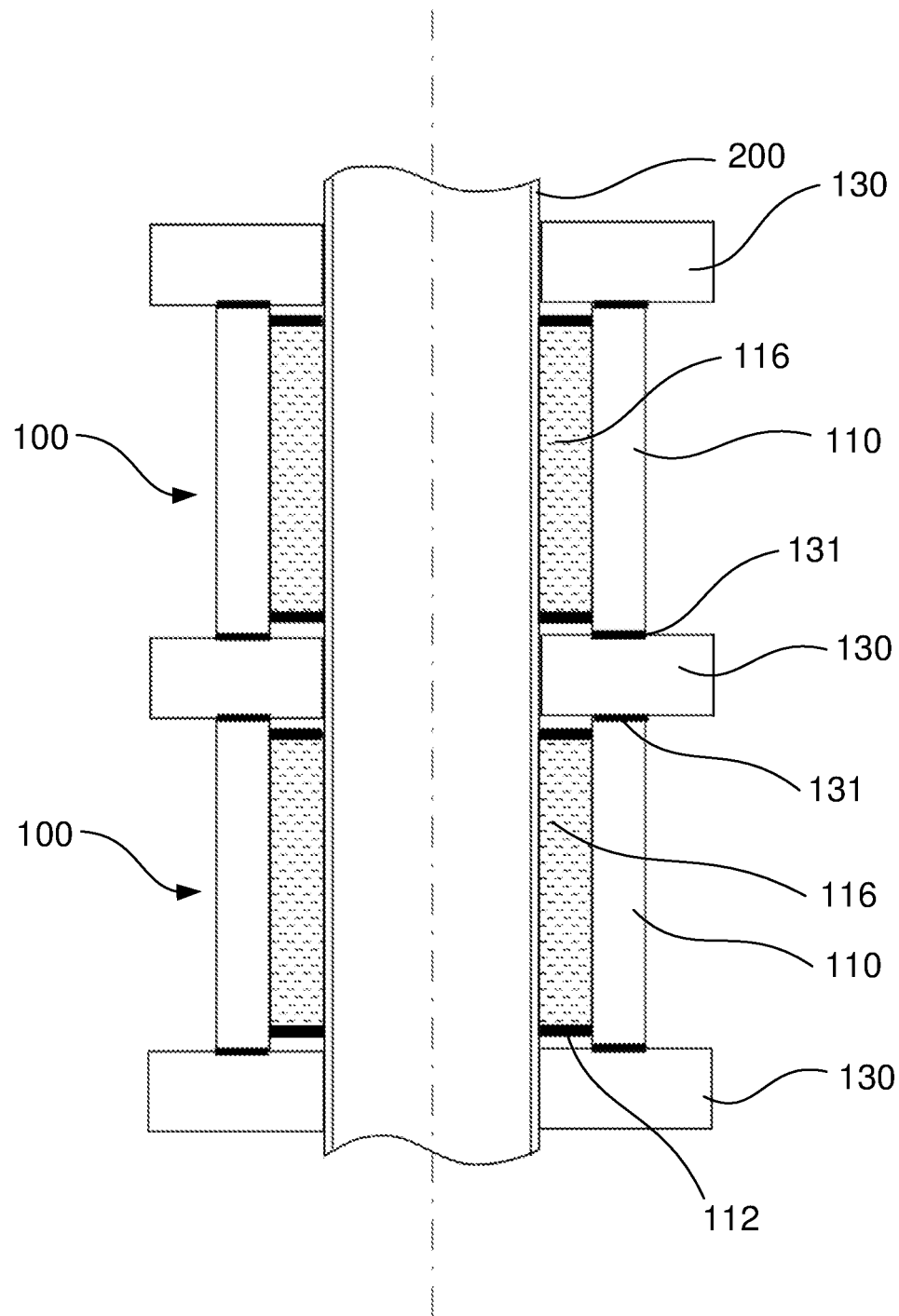
FIG. 16a-b are principle drawings of a further embodiment of the disclosed vibration damper assembly comprising several vibration damper assemblies arranged to each other in longitudinal direction of a structure.
Figure 16B:
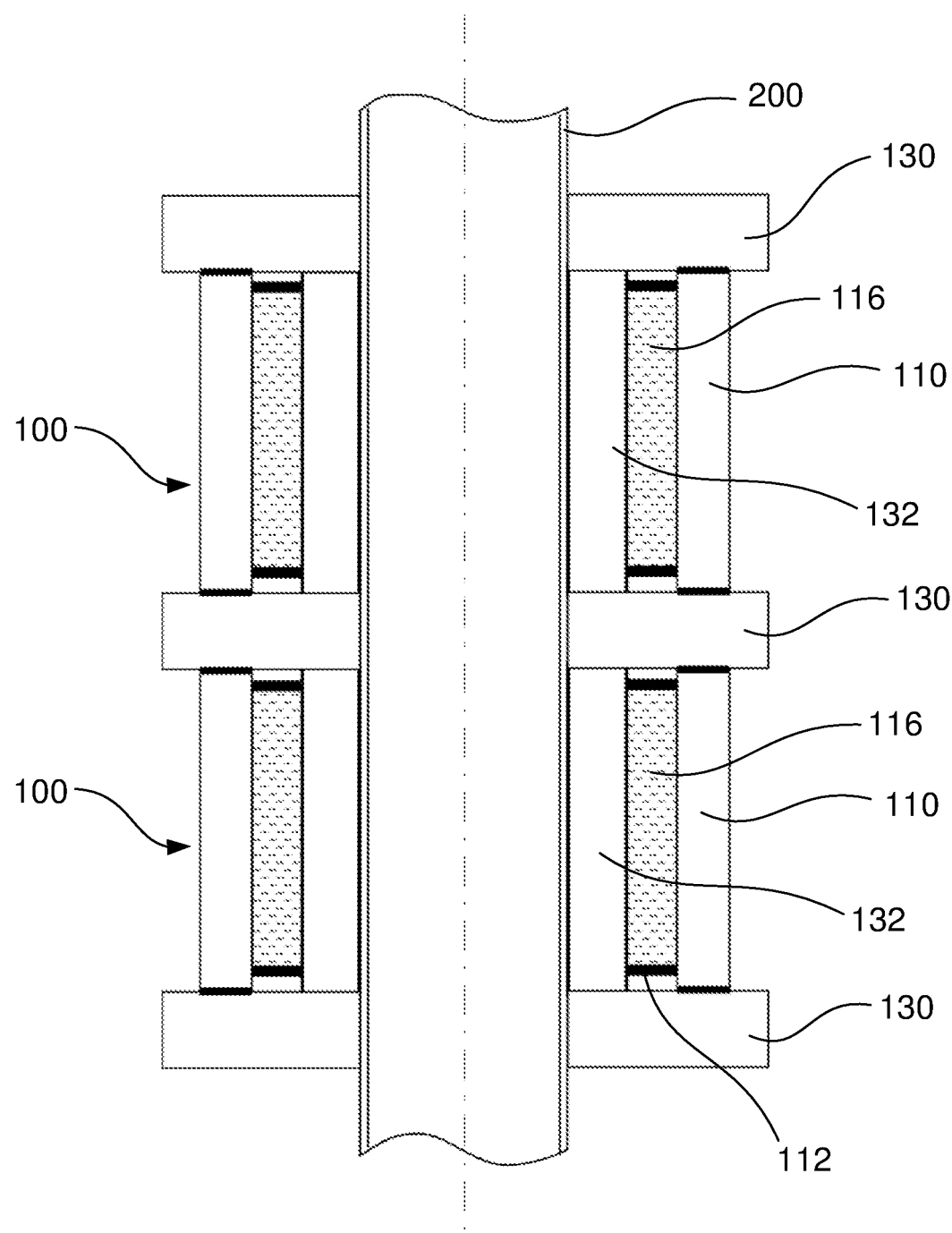

Buoyancy can be achieved by that the damper volume 111 is filled with air, or that the outer cover 110 is provided with spacers 115 having buoyancy, buoyancy in annular spacers 130 (as shown in FIG. 16a) or in a separate inner layer or spacer 132 (as shown in FIG. 16b) or buoyancy in outer cover 110.

Figure 11A:
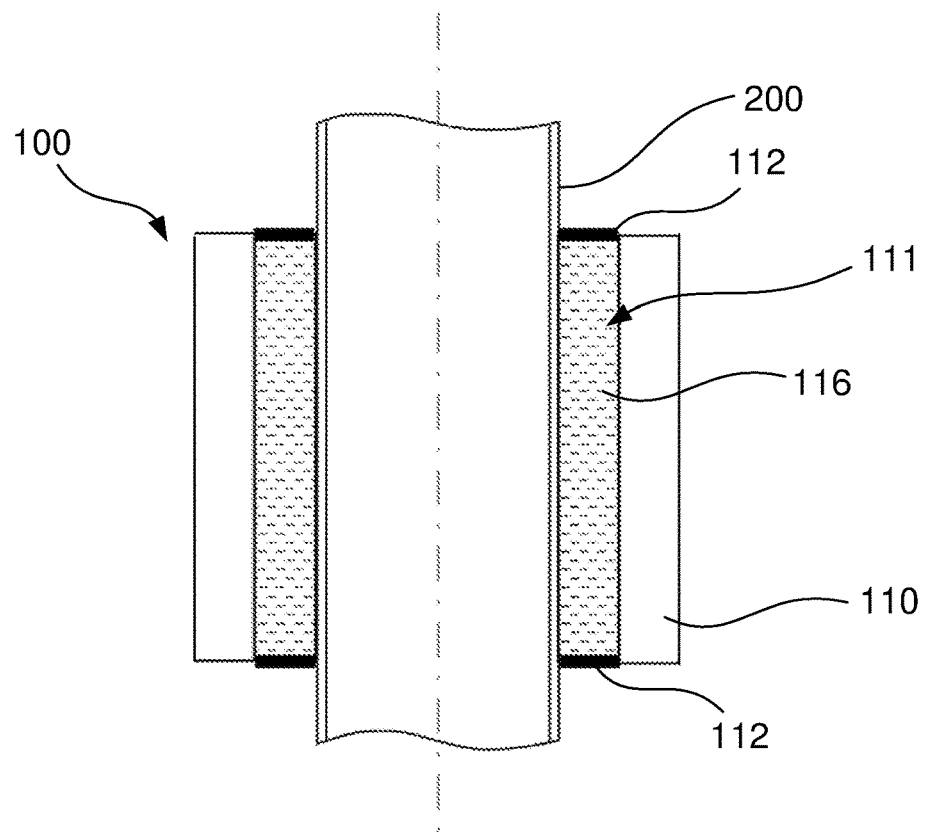
FIG. 11a-b are principle drawings of a further embodiment of the disclosed vibration damper assembly.
Figure 11B:
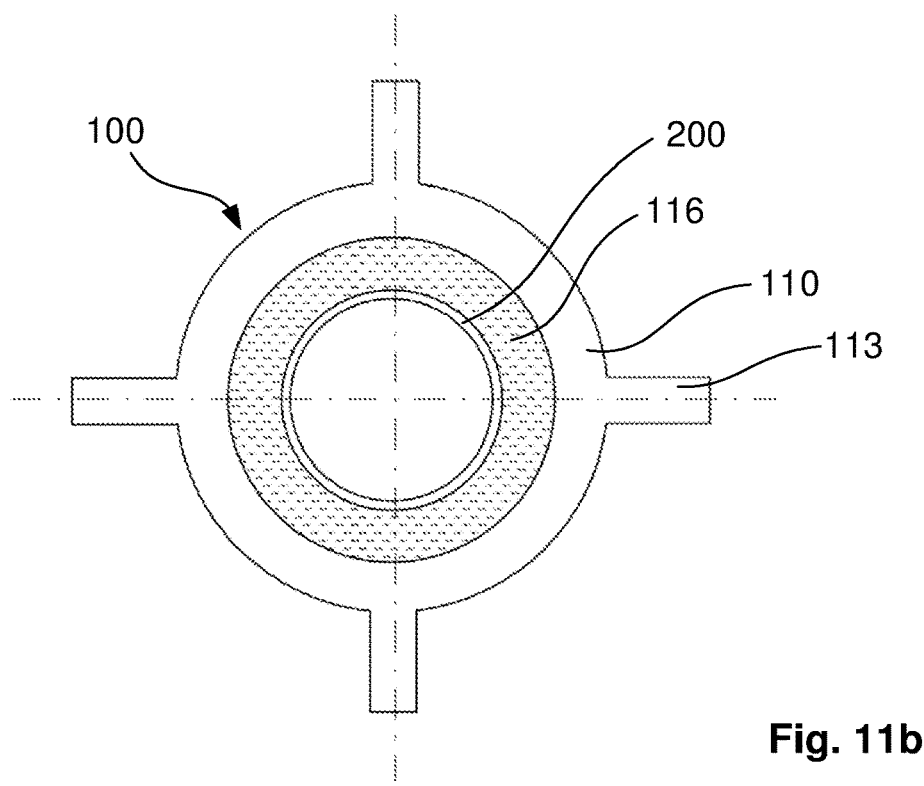

Reference is now made to FIGS. 11a-b which are principle drawings of a further embodiment of the vibration damper assembly 100. The damping coefficient c can be realized through a viscous fluid layer 116 in the damper volume 111 between the outer cover 110 and the structure 200, 210, 220, 300. Different types of fluids such as pitch (i.e. bitumen), silicone fluid or other types of viscoelastic polymers can be used in the viscous liquid layer 116 given that the viscosity is sufficiently high to produce the necessary damping. The thickness of the viscous fluid layer 116 should accommodate the necessary full range motion of the vibration damper assembly 100.

Figure 12:
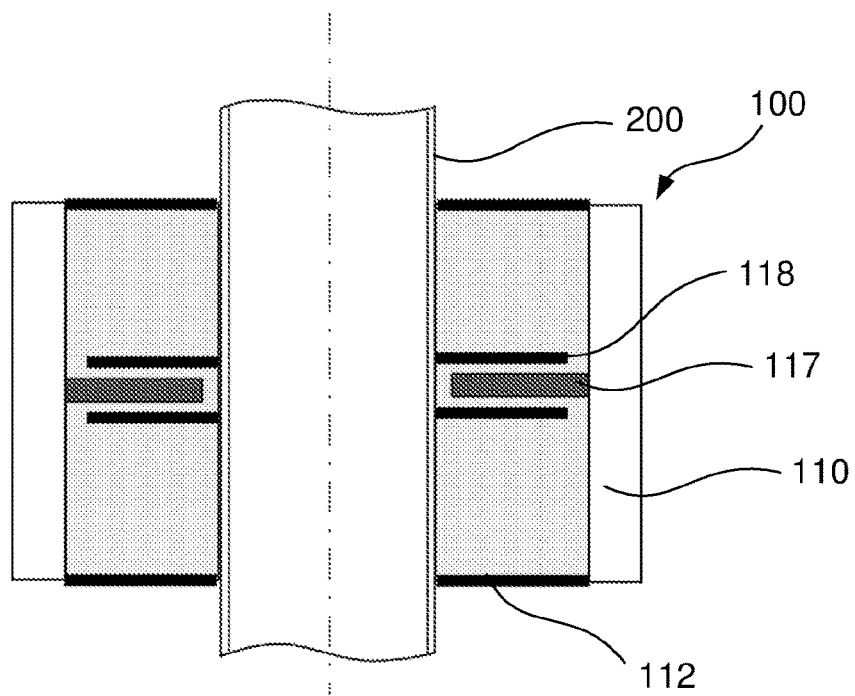
FIG. 12-15 are principle drawings of further embodiments of the disclosed vibration damper assembly, respectively.

Reference is now made to FIG. 12 which is a principle drawing of a further embodiment of the vibration damper assembly 100 providing an alternative solution for realization of the damping coefficient c to the embodiment of FIGS. 11a-b. In the embodiment of the vibration damper assembly 100 in FIG. 12 the damping coefficient c is achieved by means of a magnet or magnet assembly 117 and plates 118 with high electrical conductivity. According to the shown embodiment two plates 118 are arranged extending mainly perpendicularly from the outer circumference of the structure 200, 210, 220, 300 and towards the inner circumference of the outer cover 110, and spaced apart in the longitudinal direction of the structure 200, 210, 220, 300, i.e. in the damper volume 111, but not in contact with the outer cover 110. According to the shown embodiment the magnet or magnet assembly 117 is arranged extending mainly perpendicularly from the inner circumference of the outer cover 110 and towards the outer circumference of the structure 200, 210, 220, 300, i.e. in the damper volume 111, arranged such that the magnet or magnet assembly 117 is extending between the plates 118. Accordingly, by using magnet or magnet assembly 117 and plates 118 with high electrical conductivity, an eddy current damping element can be provided. The plates 118 can alternatively be arranged to the outer cover 110 and the magnet or magnet assembly 117 to the structure 200, 210, 220, 300. Further, a number of such eddy current damping elements can be arranged spaced apart in the longitudinal direction of the structure 200, 210, 220, 300 within the damper volume 111. The magnet or magnet assembly 117 can e.g. comprise strong rare earth magnets and the plates 118 can e.g. be copper or aluminium plates. When the magnet or magnet assembly 117 are moving close to the plates 118 an alternating electric current will be produced in the plates 118. The alternating electric current will create an alternating magnetic field that will oppose the movement of the magnet or magnet assembly 117, reducing the velocity of the magnet or magnet assembly 117 and thus introduce damping.

Figure 13:
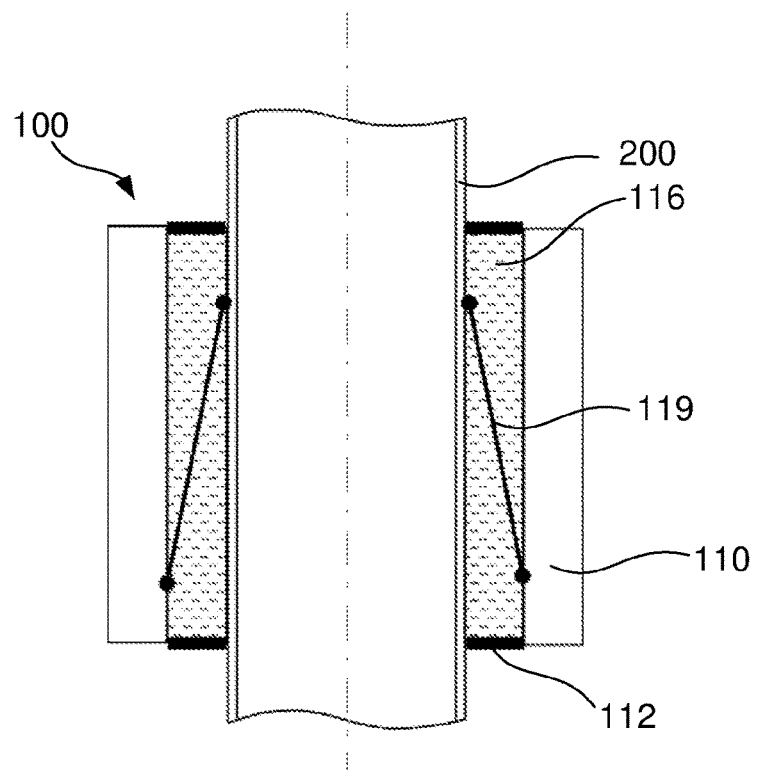

Reference is now made to FIG. 13 which is principle drawing of a further embodiment of a vibration damper assembly 100. The stiffness coefficient k can be realized for a horizontally vibrating structure 200, 210, 220, 300 by arranging the outer cover 110 to the structure 200, 210, 220, 300 by means of fastening means 119, such as wires, chains, etc., wherein the fastening means 119 are arranged to the structure 200, 210, 220, 300 at one end and to the inner circumference of the outer cover 110 at the other end, wherein the fastening points in the structure 200 and outer cover 110 for the fastening means 119 are displaced in the longitudinal direction of the outer cover 110, for in this way to provide a pendulum. By changing the length of the fastening means 119, i.e. the pendulum, the frequency of the vibration damper assembly 100 can be tuned.

Figure 14:
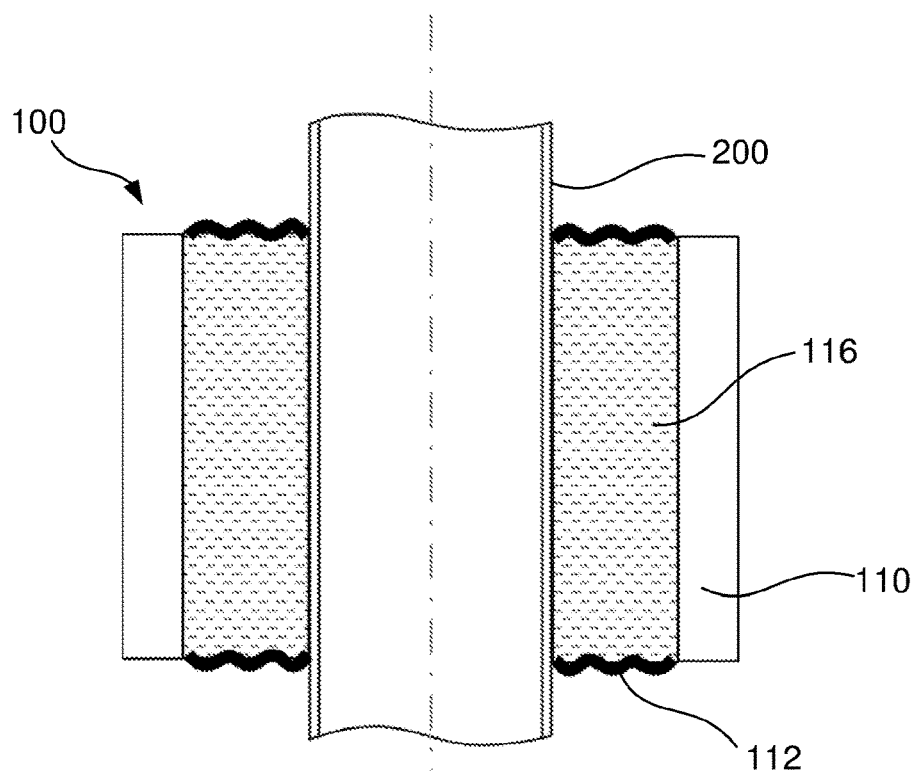

Reference is now made to FIG. 14 which is a principle drawing of a further embodiment of the vibration damper assembly 100. In this embodiment, the seals 112 separating the outer cover 110 from the structure 200, 210, 220, 300 can in addition act as a spring element for the vibration damper assembly 100. Providing the seals 112 with spring-functionality can be achieved by that the seals 112 are formed by elastic materials like elastomers/rubber capable of providing a bellows/gasket/sleeve/seal that provides the necessary stiffness.

Figure 15:
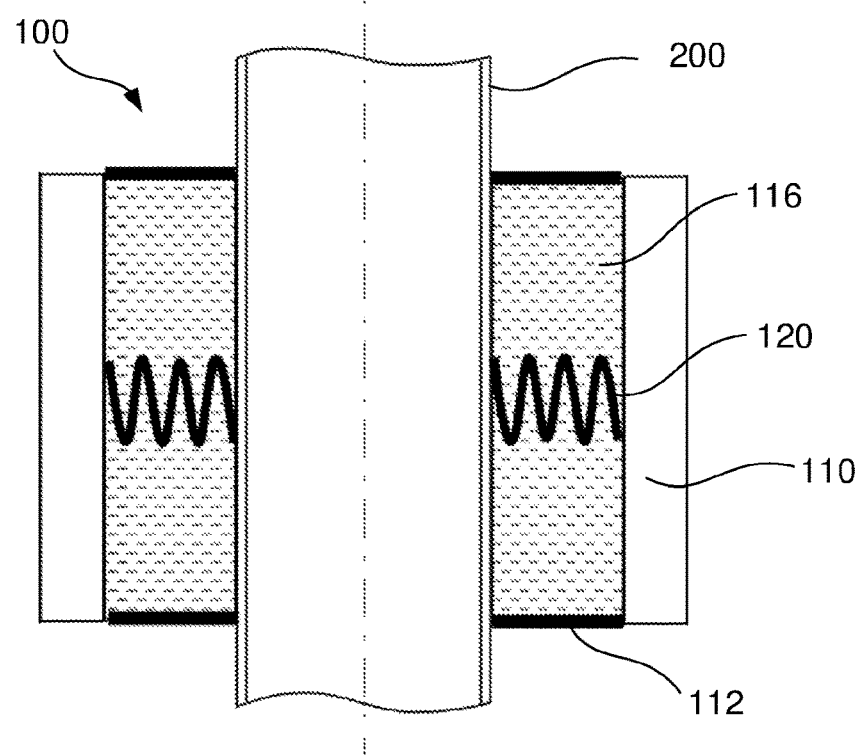

Reference is now made to FIG. 15 showing a principle drawing of a further embodiment of the vibration damper assembly 100, which is an alternative embodiment to the embodiment of FIG. 14. In this embodiment, the vibration damper assembly 100 is provided with one or more mechanical springs or spring assemblies 120 extending between the outer circumference of the structure 200, 210, 220, 300 and the inner circumference of the outer cover 110, arranged in the viscous layer 116 in the damper volume 111.

Reference is now made to FIG. 16a showing a further embodiment of the vibration damper assembly 100, where several separate vibration damper assemblies 100 are arranged to each other in longitudinal direction of a structure 200, 210, 220, 300. As shown, several vibration damper assemblies 100 can be arranged to each other by means of annular spacers 130 which keep the vibration damper assemblies 100 in place to the structure 200, 210, 220, 300. The annular spacers 130 are preferably provided with sliding surfaces 131 for the outer covers 110 of the vibration damper assemblies 100. The sliding surfaces 131 of the annular spacers 130 can have low or high friction. At high friction the viscous layer 116 can be replaced with an incompressible fluid, such as water. Accordingly, the sliding surfaces 131 can be used for providing the damper assembly 100 with a desired damping coefficient c. The annular spacers 130 will further act as a buoyancy element for the structure 200.

Reference is now made to FIG. 16b which is a principle drawing of a modified embodiment of the embodiment shown in FIG. 16a. In the embodiment shown in FIG. 16b there is arranged an inner layer or longitudinal spacer 132 between the viscous layer 116 and the elongated structure 200. This will enable the assembly of several vibration damper assemblies 100 to form a damper unit which is simple to retrofit to a semi-submerged or submerged elongated structure 200. The inner layer or longitudinal spacer 132 can further act as a buoyancy element similar to the annular spacers 130 and outer cover 110.

The viscous layer 116 in FIGS. 16a-b can be replaced with a friction surface, eddy current damping and/or spring as described above.

Further, the vibration damper assemblies 100 arranged to each other can be arranged to cover different vibration frequency ranges.

Figure 17:
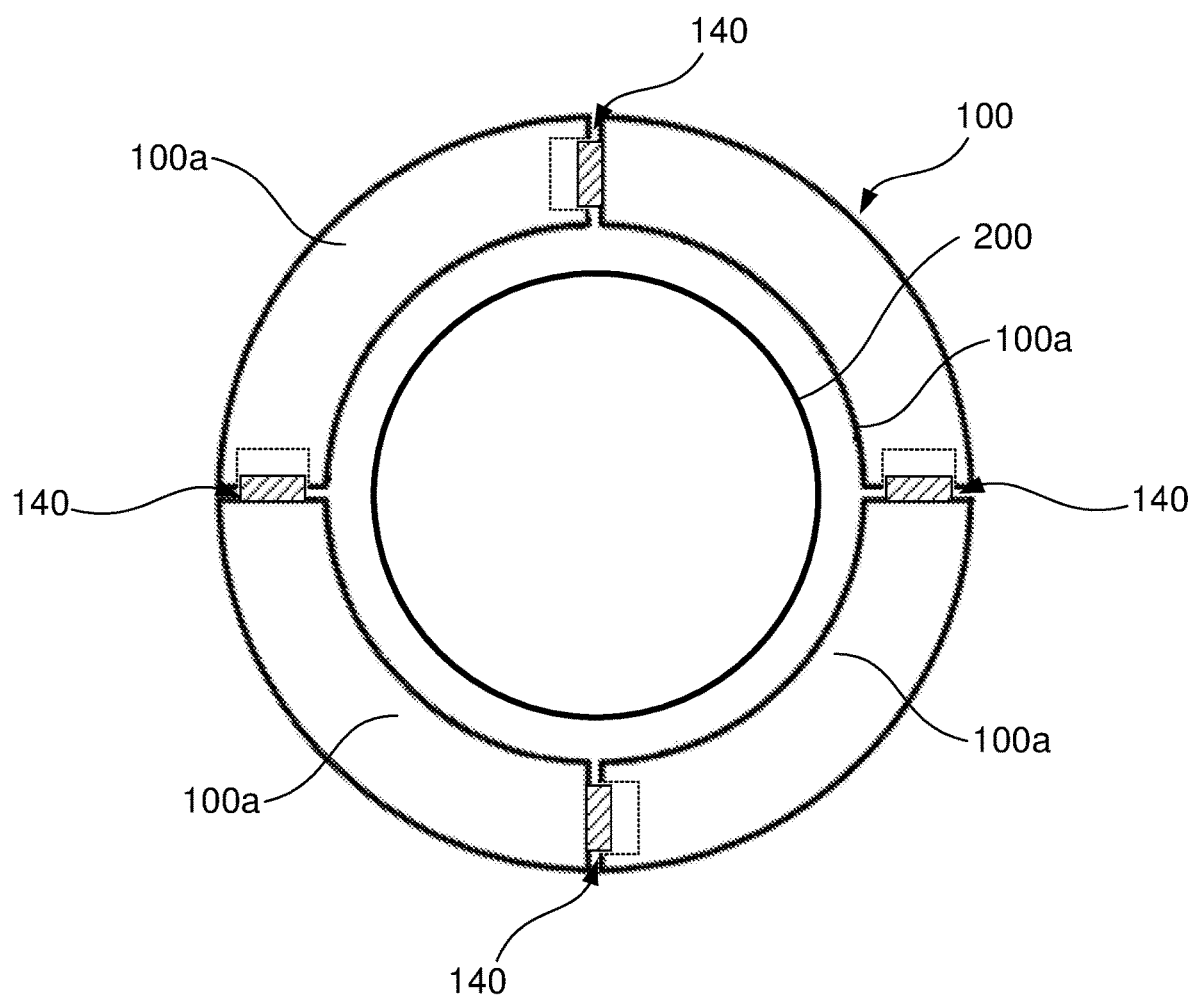
FIG. 17 is a principle drawing of a vibration damper assembly divided in segments.

Reference is now made to FIG. 17 which is a principle drawing of a further embodiment of the vibration damper assembly 100. The disclosed vibration damper assembly 100 can further be arranged for retrofitting to existing structures 200, 210, 220, 300 by that it is divided in segments 100a arranged for mutual connection by being provided with a snap-on or a clamp-on mechanism 140 that can be handled by divers or a ROV. This will also enable segments 100a of the vibration damper assembly 100 to be arranged in circumferential direction of the structure 200 for use with large diameter structures 200, 210, 220, 300.

The length of the vibration damper assembly 100 can be varied from very short, below the diameter for the structure 200, 210, 220, 300, up to very long lengths. The vibration damper assembly 100 should allow for the vibrating structure 200, 210, 220, 300 to move freely without getting in contact with the outer cover 110. The mass ratio will not be affected by the length as the ratio is given by the cross section geometry of the outer cover 110 in comparison to the mass per length properties of the vibrating structure 200, 210, 220, 300.

The vibration damper assembly 100 will not add hydrodynamic or gravity loads to the structure 200, 210, 220, 300 due to the separation of the hydrodynamic mass from the vibrating structure 200, 210, 220, 300 and the use of ambient water instead of a metal mass, that is usually used in a conventional TMD.

The vibration damper assembly 100 will maintain near neutral buoyancy of the outer cover 110 creating the effect of the hydrodynamic reaction mass. This will prevent the outer cover 110 from being in contact with the vibrating structure 200, 210, 220, 300 at all times and thus allowing the vibration damper assembly 100 to be oriented in both the vertical and horizontal direction.

Figure 18:
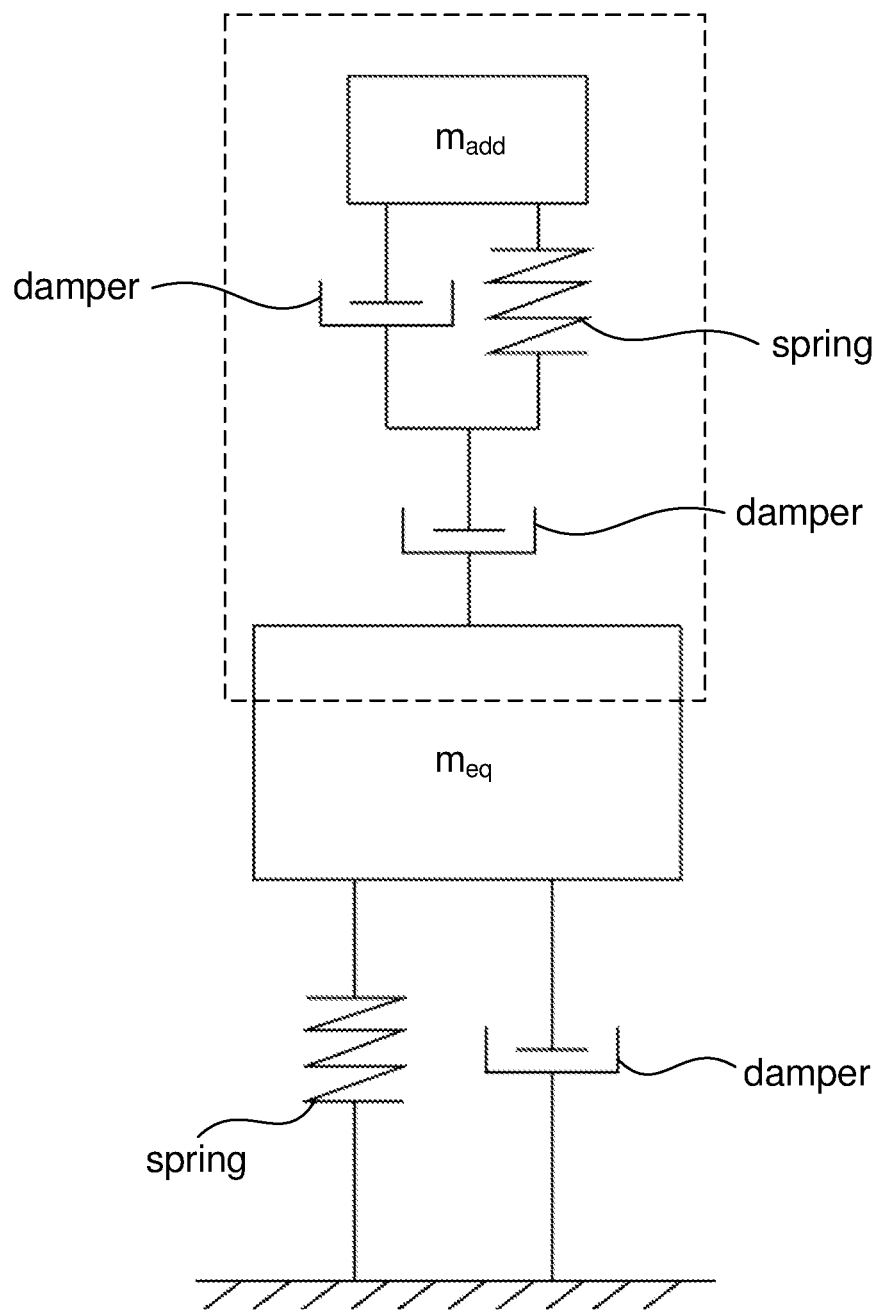
FIG. 18 is a principle drawing of a further embodiment of the vibration damper assembly.

The outer cover 110 for the vibration damper assembly 100 does not require to be made in any particular material, but plastic or composite is most likely due to its near neutral buoyancy and ease of production and cost. The material of the outer cover 110 can be rigid or flexible and have additional damping added. Reference is now made to FIG. 18 which is a principle drawing of a further embodiment of the vibration damper assembly 100 arranged for introducing stiffness and/or damping in series to the above described spring elements 112, 119, 120 and/or damping elements 116, 117-118. This can, be achieved by that the outer cover 110 is of a rigid or flexible material.

Figure 21A:
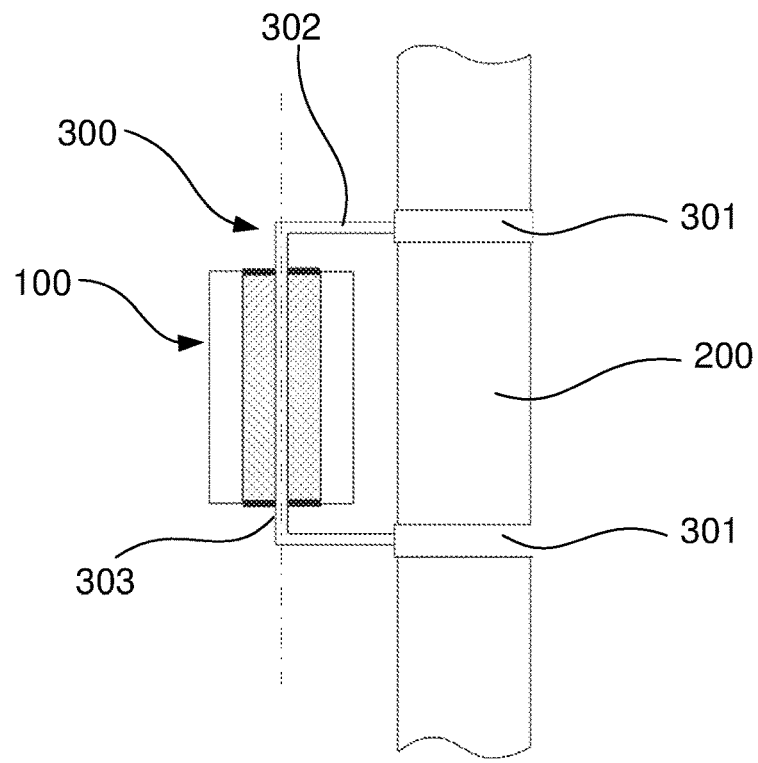
FIG. 21a-e are principle drawings of a further embodiment of the disclosed vibration damper assembly arranged to different structures.
Figure 21B:
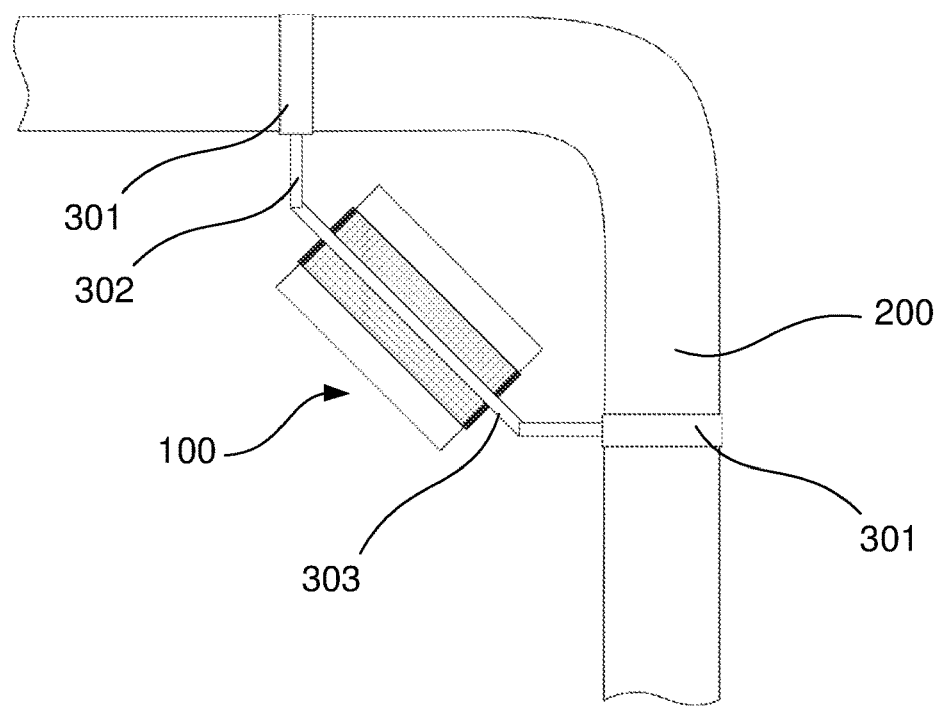

Reference is now made to FIGS. 21a-b which are principle drawings of a further embodiment where the vibration damper assembly 100 is arranged to a vibration damper support structure 300 arranged to the structure 200, 210, 220 to be dampened. In this embodiment the solid support structure 300 is formed by a clamp assembly comprising two clamps 301 for arrangement to the structure 200, 210, 220, and further comprising rods 302 extending from the respective clamps 301 and a rod 303 connecting the rods 302, the vibration damper support structure 300 positioning the vibration damper assembly 100 exterior/remotely of the structure 200, 210, 220, wherein the vibration damper support structure 300 will transfer vibrations from the structure 200, 210, 220 to the vibration damper assembly 100 via the clamps 301 and rods 302, 303. In the shown example in FIG.

Figure 21C:
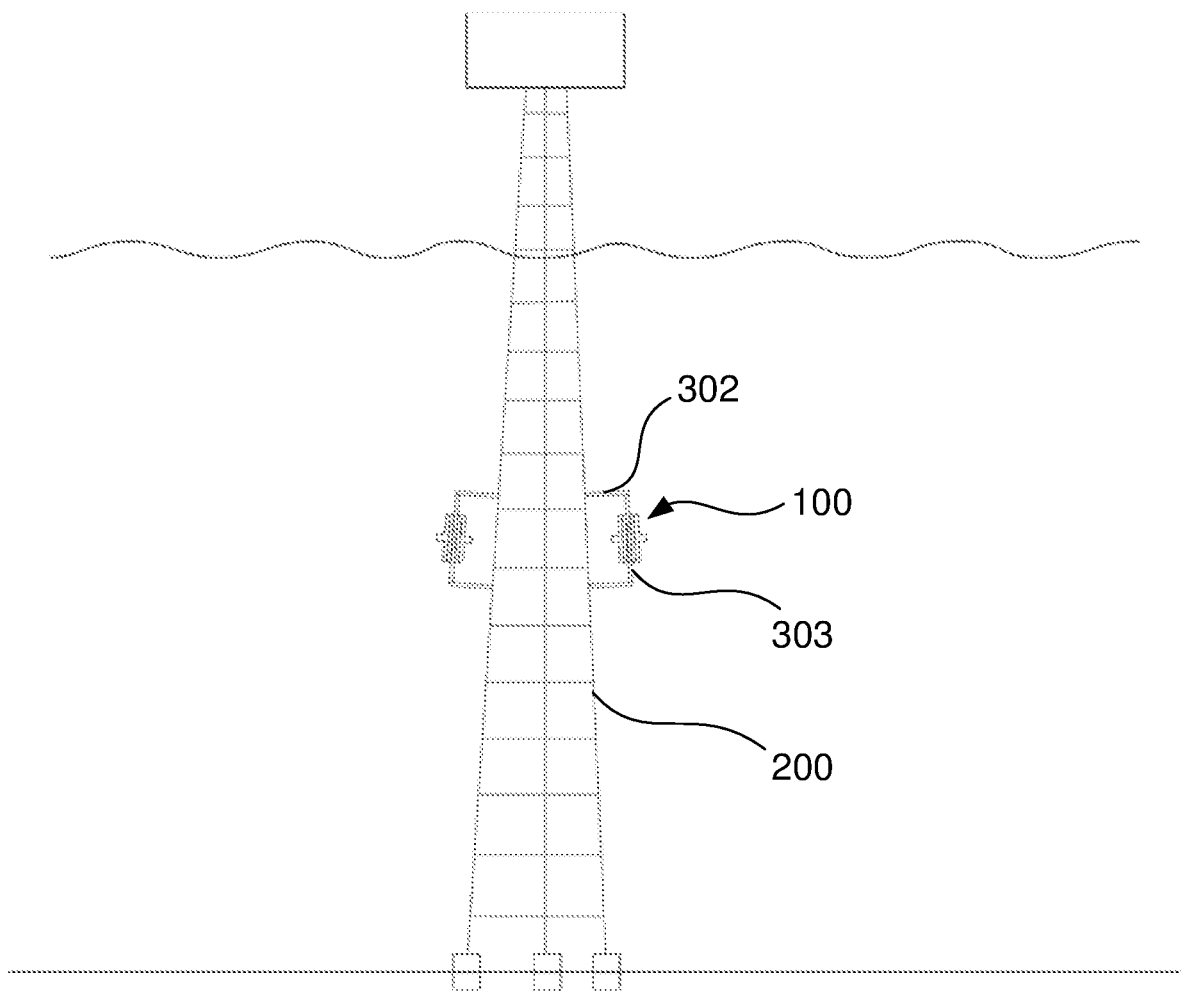

21*a* the vibration damper assembly 100 is enclosing the rod 303 which is in stiff connection with the structure 200, 210, 220 to be dampened via the rods 302 and clamps 301. It should be mentioned that the above-described embodiments will also apply for this embodiment. The structure 200, 210, 220 in FIGS. 21*a-b* can e.g. be a transport pipe or sea cable. In FIG. 21*c* is shown an example of vibration damper assemblies 100 based on this principle arranged on support structures 200, 210, 220 in a subsea-on-stick application.

As shown in FIG. 21*b* the rods 302 and 303 can be arranged in different angles in relation to each other enabling the vibration damper assembly 100 to be arranged in different positions in relation to the structure 200, 210, 220, e.g. arranged to both sides of a pipe bend.

Figure 1:
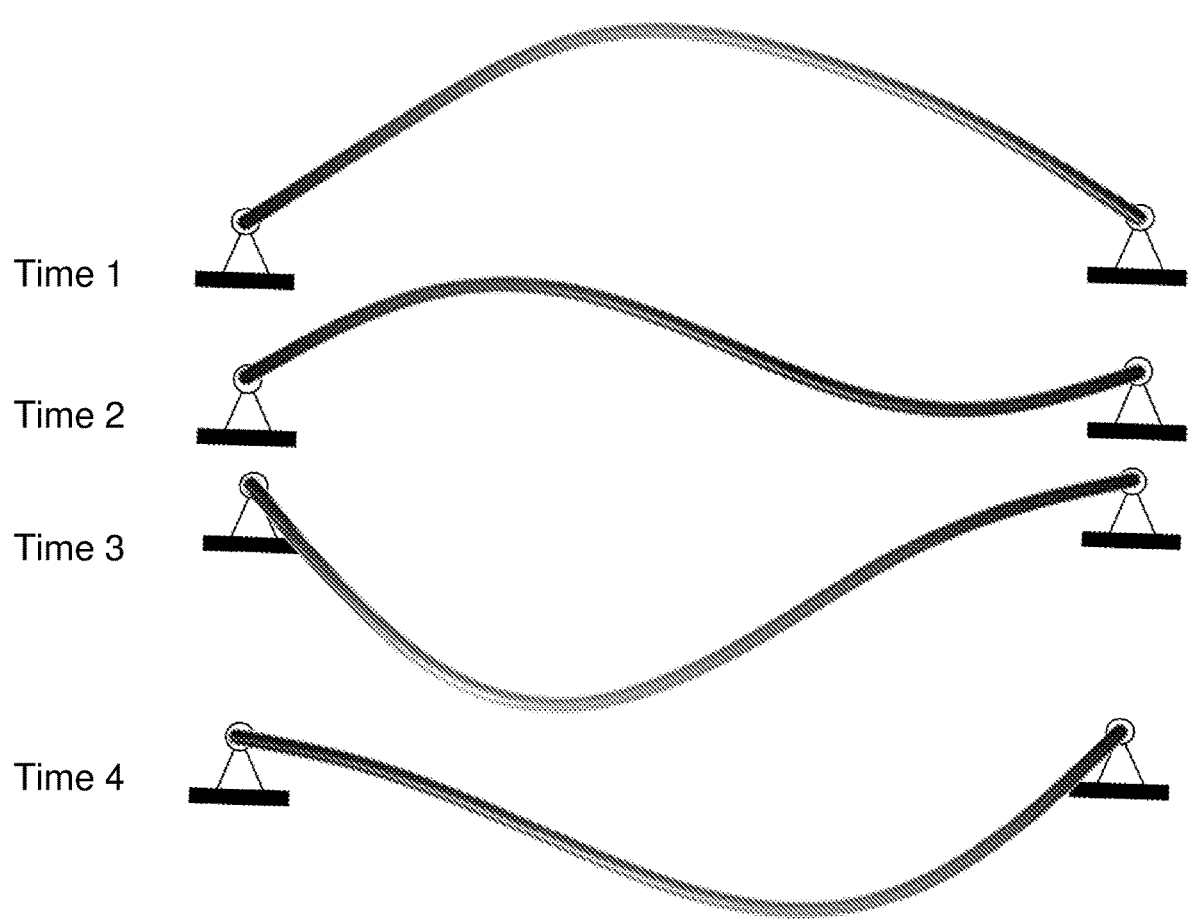
FIG. 1 is a principle drawing of a vibrating elongated structure and frequency response thereof.
Figure 2:
FIG. 2 is a principle drawing showing the eigenmodes/natural modes of the vibrating elongated structure in FIG. 1.
Figure 2:
Figure 2:
Figure 3:
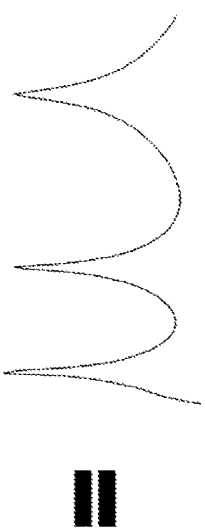
FIG. 3 is principle drawing of frequency response at given position in FIG. 2.
Figure 3:
Figure 3:
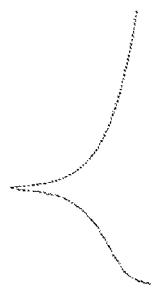
Figure 3:
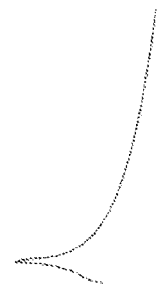
Figure 4:
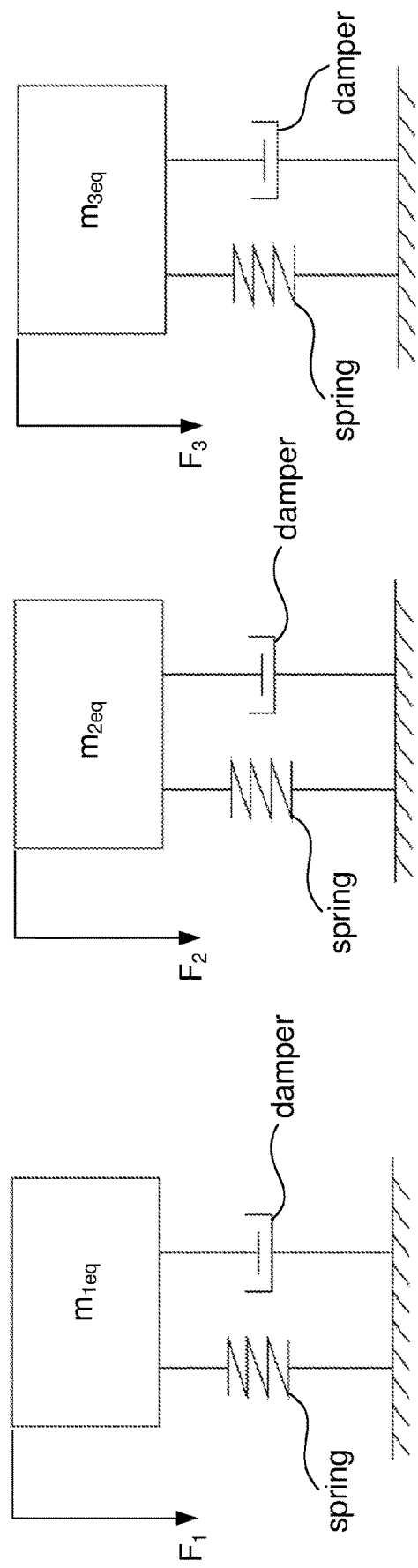
FIG. 4 is a principle drawing of a lumped mass system.
Figure 5:
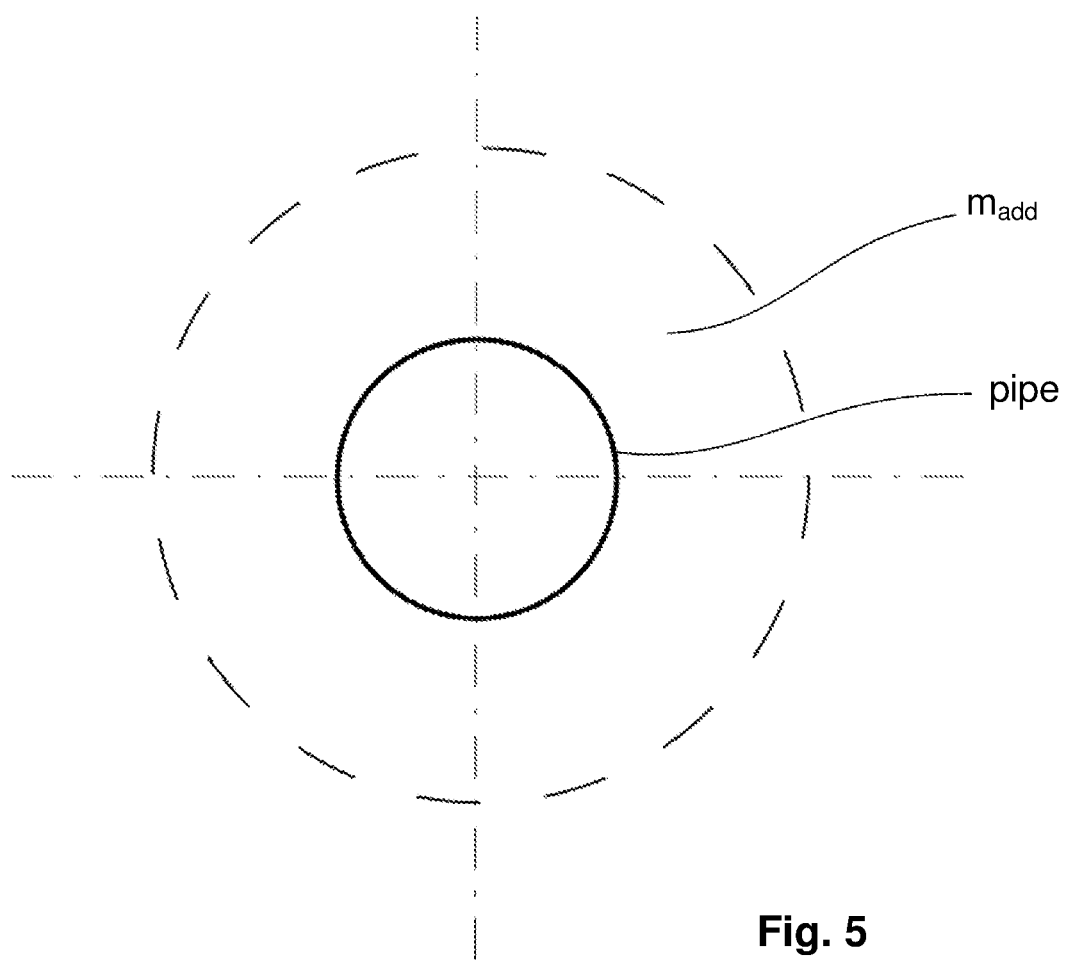
FIG. 5 is a principle drawing of a pipe dynamic model.
Figure 6:
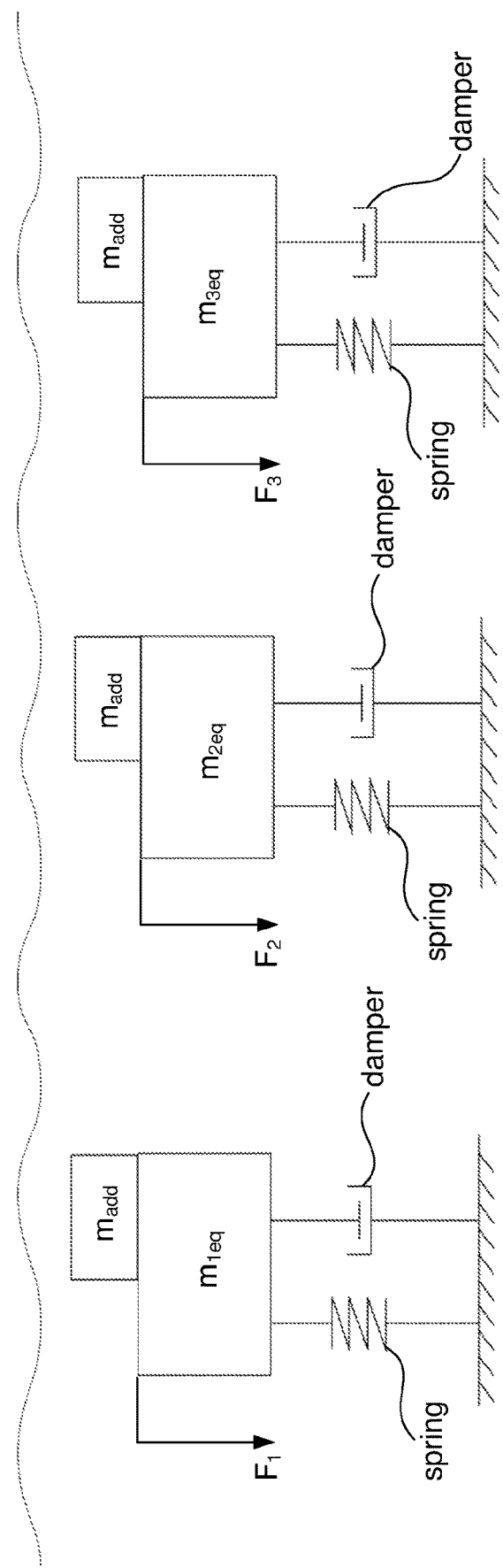
FIG. 6 is a principle drawing of a submerged lumped mass system.
Figure 7:
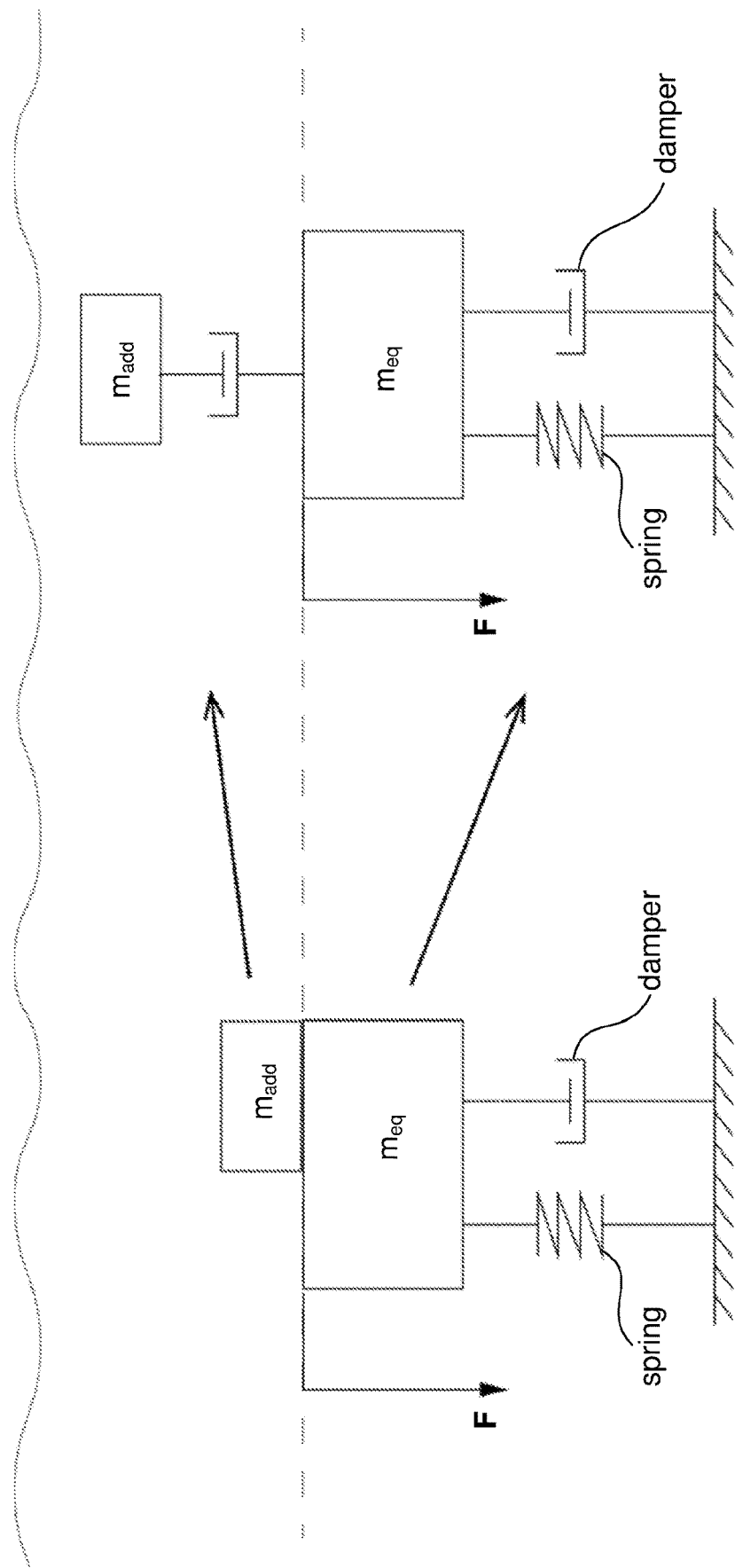
FIG. 7 is a principle drawing of the main principle of a vibration damper assembly according to the disclosure.
Figure 8:
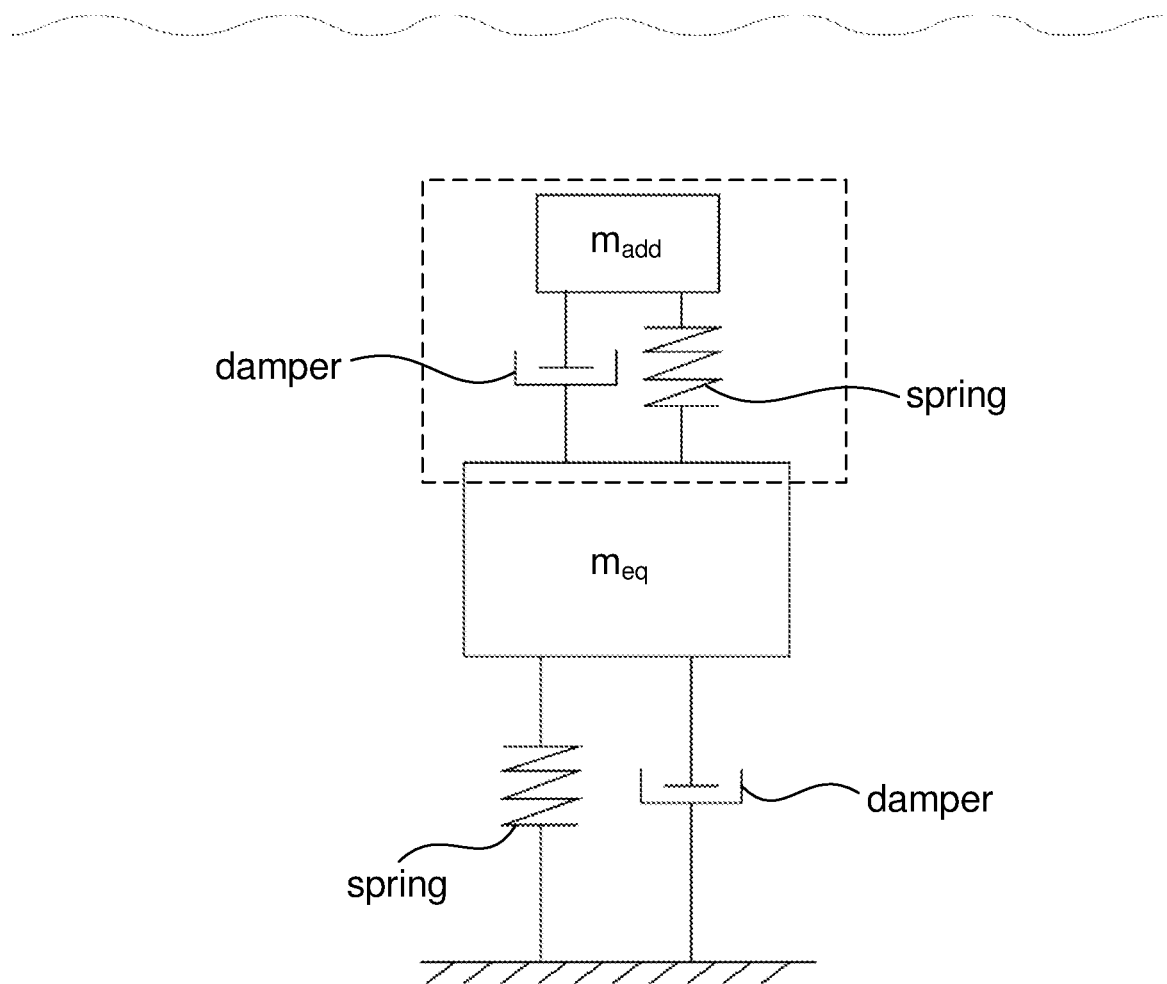
FIG. 8 is a principle drawing of vibration damper assembly according to an embodiment of the disclosure that can be recognized as a tuned mass damper.
Figure 9:
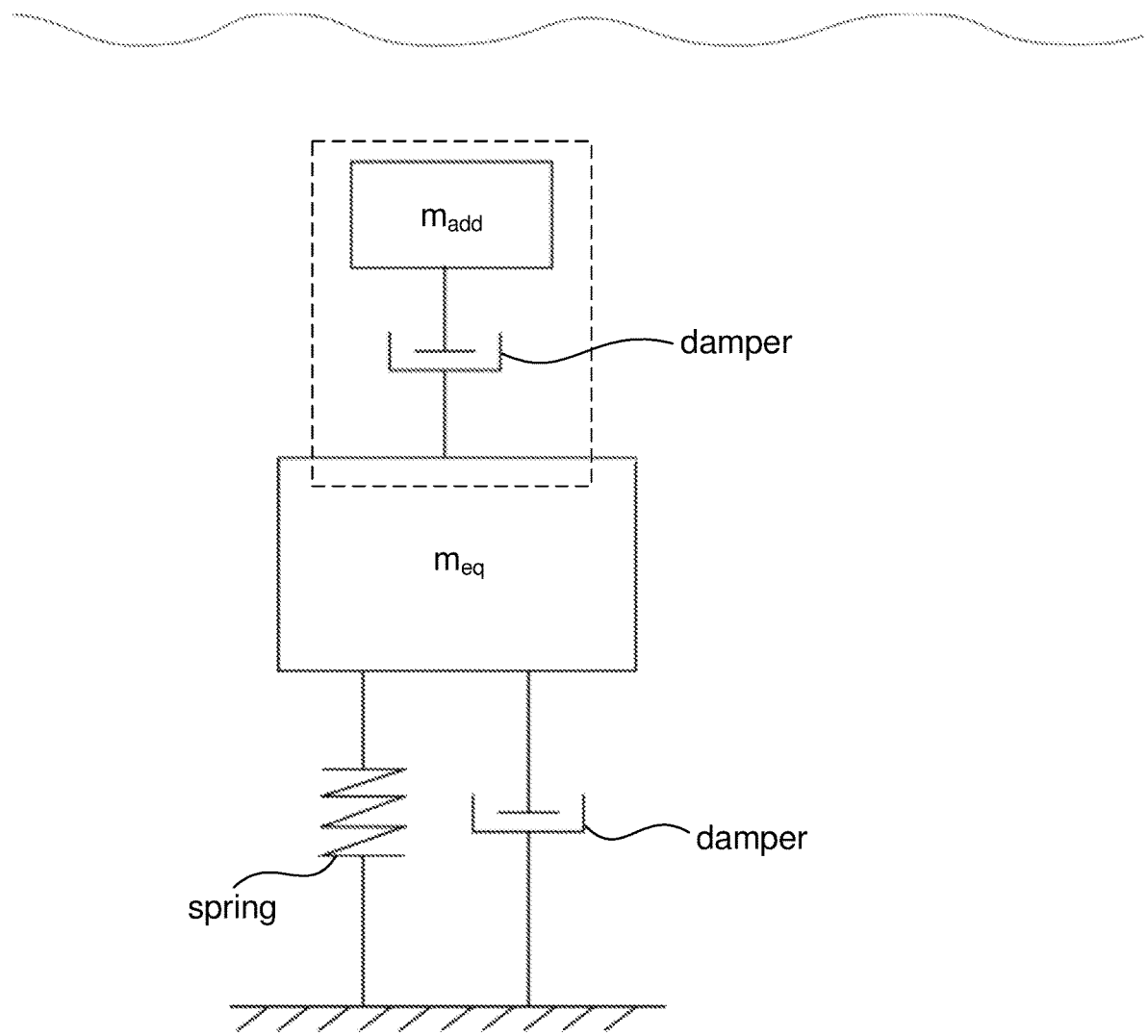
FIG. 9 is a principle drawing of a vibration damper assembly according to an embodiment of the disclosure that can be recognized as a Lanchester damper.
Figure 21D:
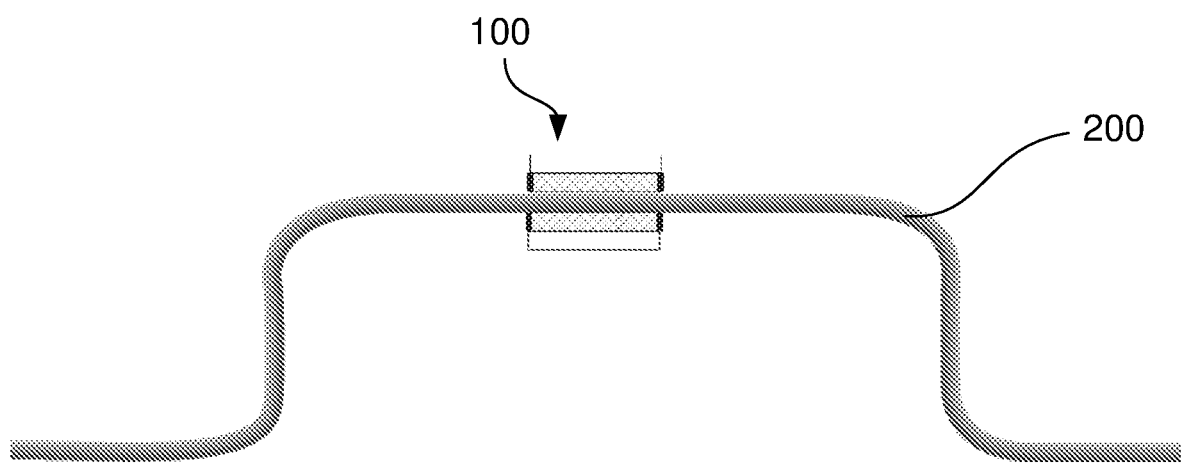
Figure 21E:
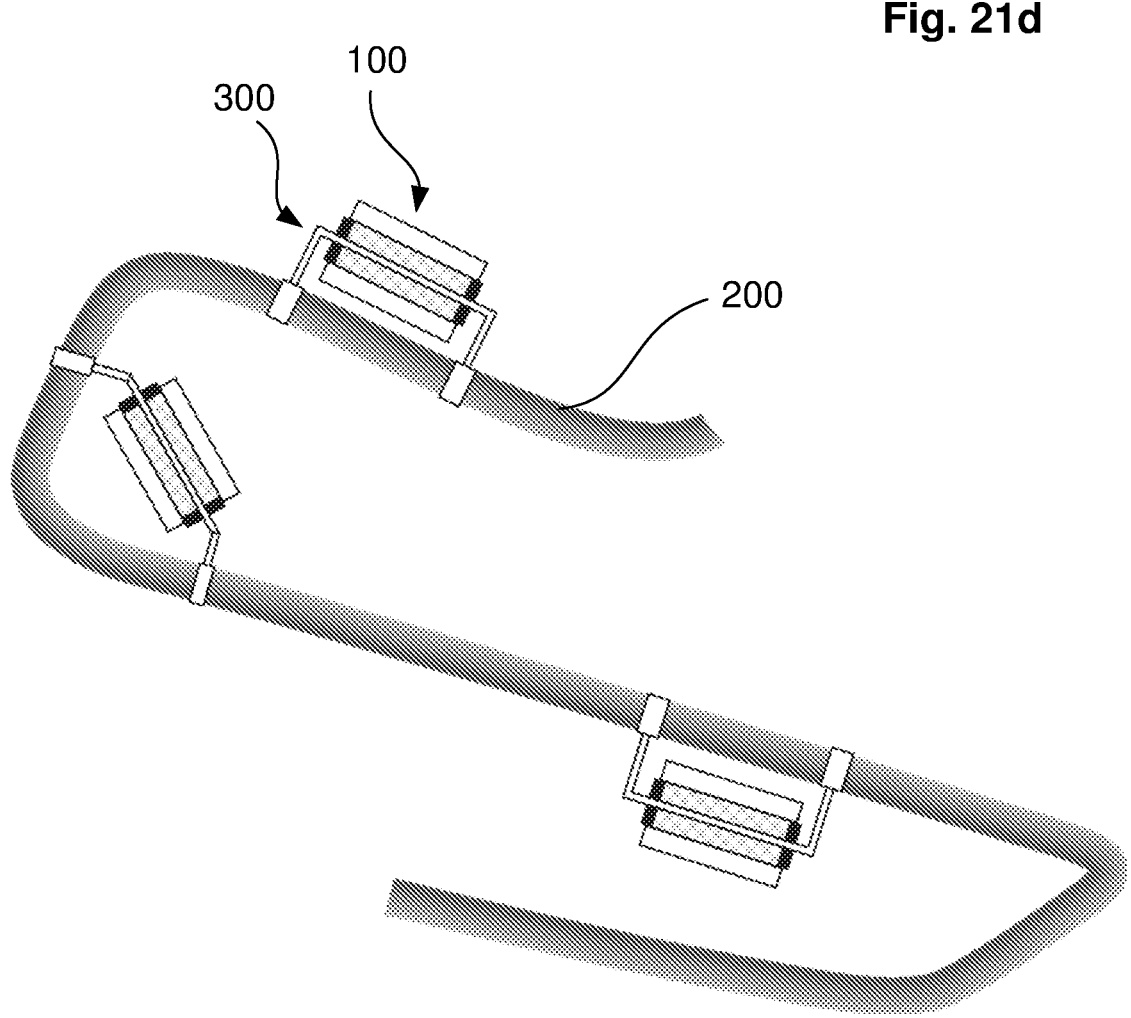

In FIG. 21*d-e* are shown examples of the arrangement of vibration damper assemblies 100 to structures 200 in the form of jumper and flex loops, wherein FIG. 21*d* show an example where the vibration damper assembly 100 is arranged enclosing a part/section of the jumper and flex loops, while FIG. 2*e* show an example of the use of the above-described vibration damper support structure 300 for arrangement of the vibration damper assemblies 100 to the jumper and flex loops.

Figure 22A:
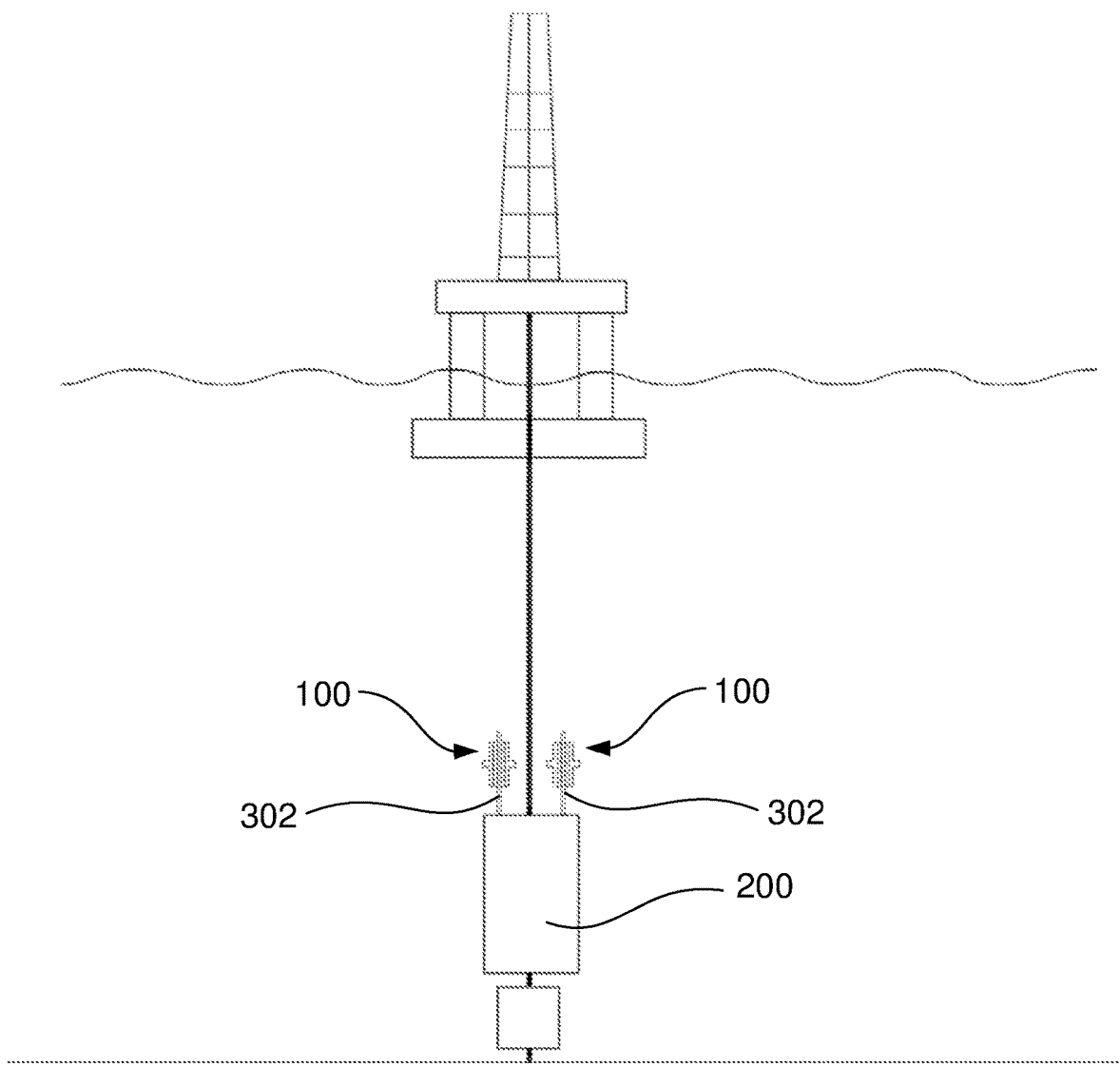
FIG. 22a-c are principle drawings of a further embodiment of the disclosed vibration damper assembly arranged to different structures.
Figure 22B:
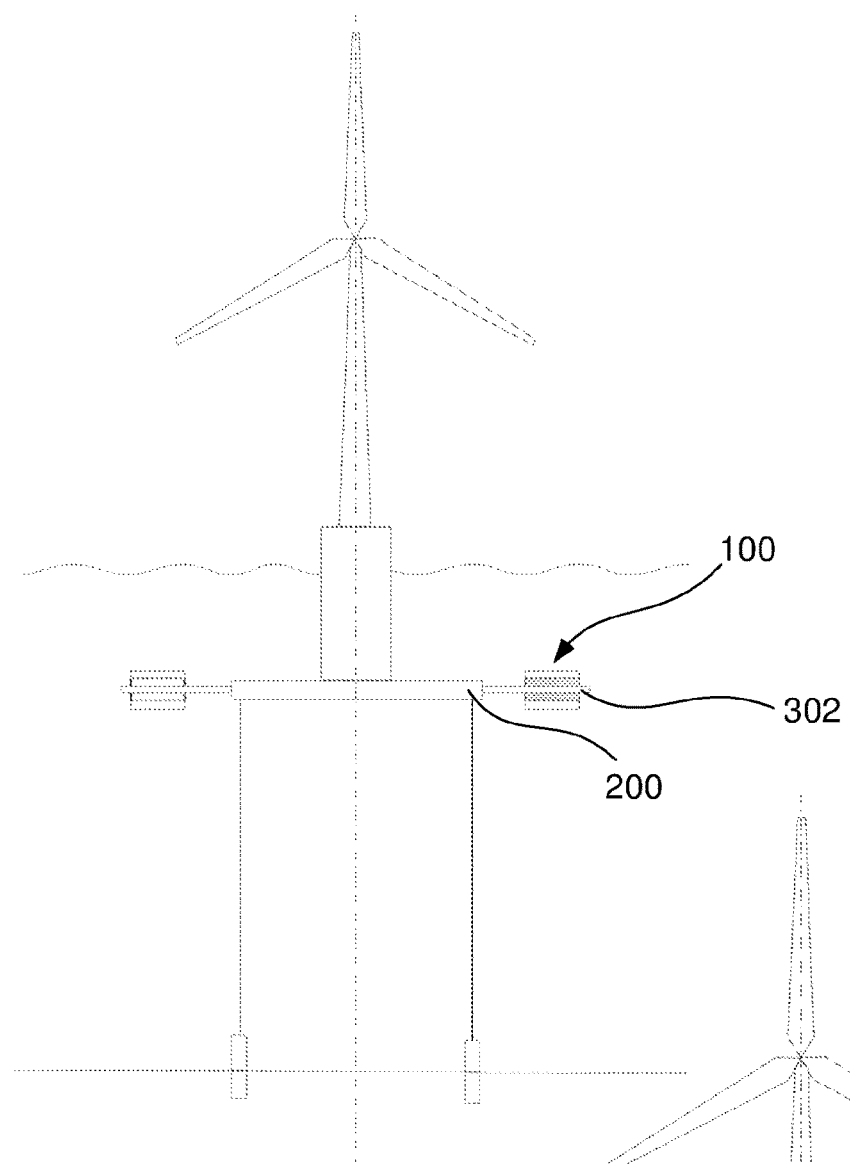
Figure 22C:
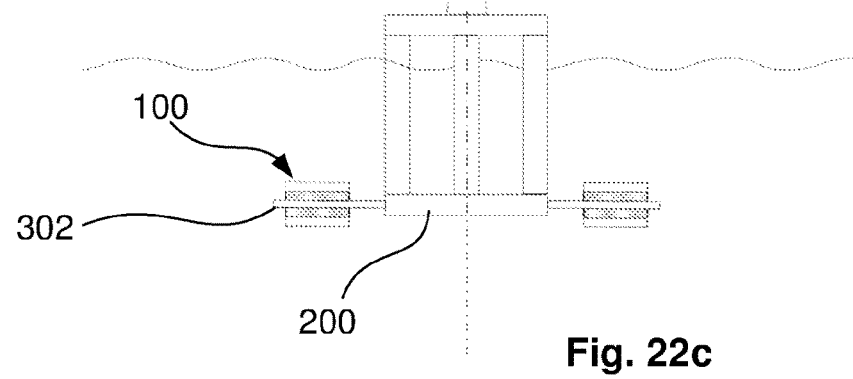

Reference is now made to FIGS. 22*a-c* which show examples of a further embodiment of the vibration damper support structure 300 in the form of rods 302 or bars fixed to a structure 200, 210, 220, which rods 302 or bars the vibration damper assembly 100 is arranged to as described above. FIG. 22*a* shows dampening of a Blow out preventer stack while FIGS. 22*b-c* show dampening of support structures for an offshore wind turbine, fixed to seabed (pillar, tension leg) and floating/semi-submersible, respectively.

Figure 23A:
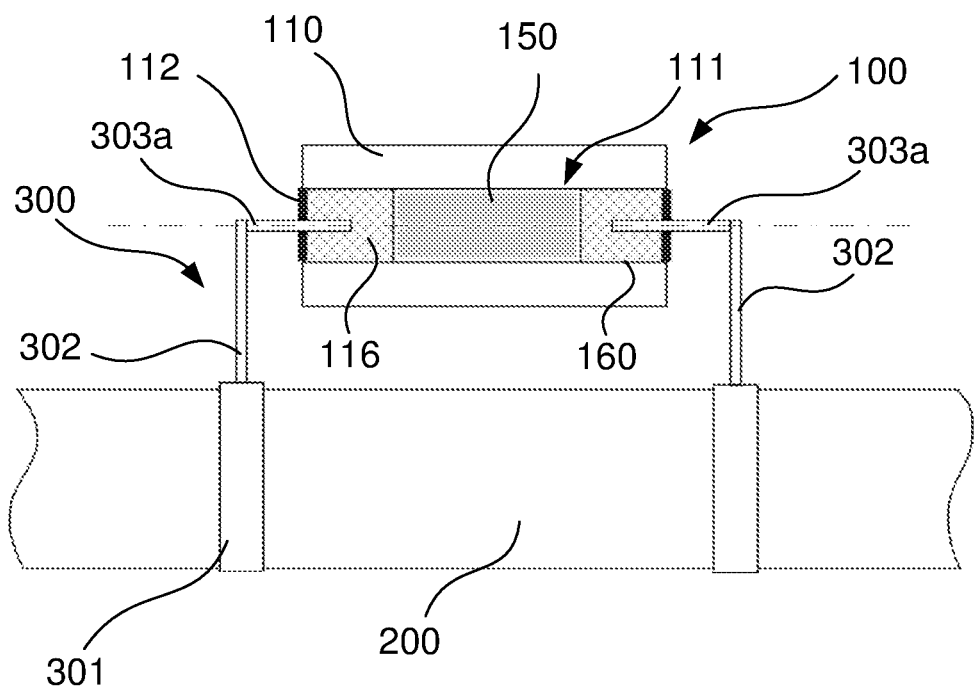
FIG. 23a-b are principle drawings of a further embodiment of the disclosed vibration damper assembly.
Figure 23B:
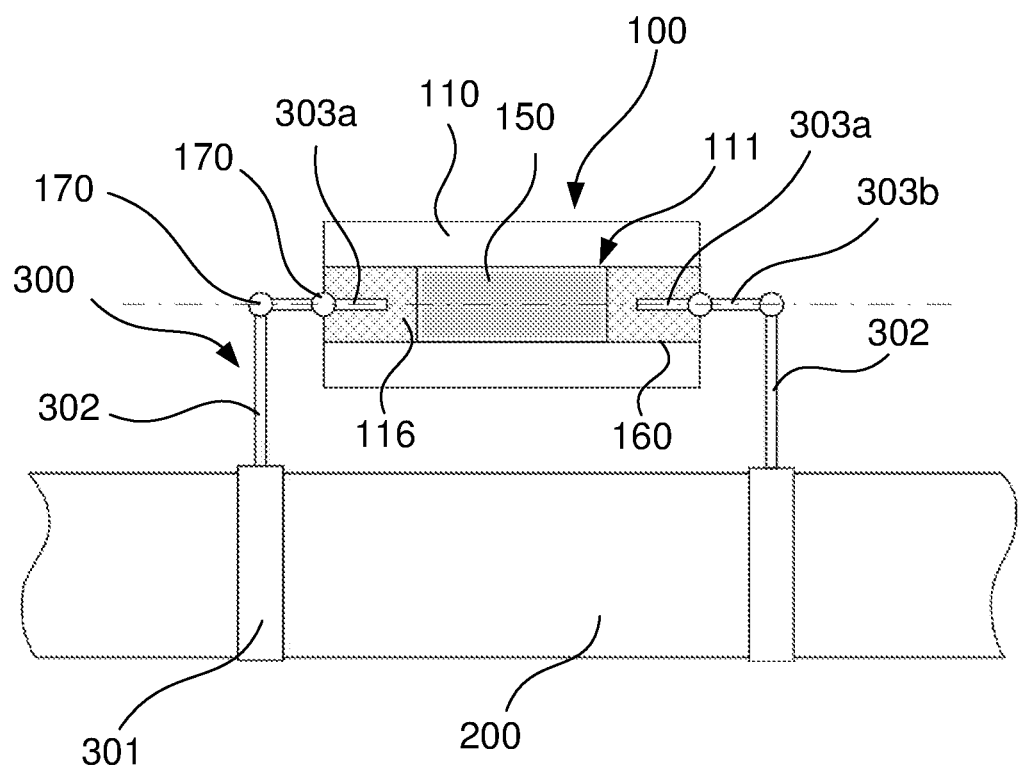

Reference is now made to FIGS. 23*a-b* showing principle drawings of a further embodiment of the vibration damper assembly 100 and vibration damper support structure 300 for arrangement to the structure 200, 210, 220 to be dampened. In this embodiment, the vibration damper assembly 100 is mainly as the above-described embodiments with some modifications which will be discussed below. In the embodiment shown in FIG. 21*a* the vibration damper assembly 100 is provided with a centrally buoyancy module 150 arranged for providing the vibration damper 100 with neutral buoyancy. At each side of the centrally buoyancy module 150 the vibration damper assembly 100 is provided with containers 160 containing a viscous fluid 116. In this embodiment the vibration damper support structure 300 does not comprise a rod 303 extending through the vibration damper assembly 100, but comprises two rods 303*a* extending from each side into the container 160 and in contact with the viscous fluid 116.

Accordingly, in this embodiment the vibration damper assembly 100 only enclose the end parts of the rods 303*a* of the vibration damper support structure 300. Also this embodiment can utilize the above described embodiments for the vibration damper assembly 100.

Further, the functionality of this embodiment is very much similar to the vibration damper assembly 100 which comprises a rod 303 through the entire assembly 100, but the damping is now distributed on the two rods 303*a* instead along the entire rod 303. The advantages with this embodiment are that it will be easier to separate the damping properties for rotational motion, and that it will enable a more simple and robust design easier to manufacture. Further advantages are that one can implement separate buoyancy modules, due to less displacement area use viscous fluids with higher viscosity, which will make it more leak-proof, and that one can control and tune the axial and radial damping parameters by using different geometry of the rods 303*a*.

In FIG. 23*b* it is shown an alternative embodiment of the embodiment in FIG. 23*a*, where the containers 160 are sealed and wherein the rods 303*a* extending into the containers 160 are provided with joints 170 for connection to the vibration damper support structure 300 at exterior surface of the container 160, and possibly also by using intermediate rod parts 303*b* for connection to the rods 302 via joints 170. This embodiment will work as the one described in FIG. 23*b*, but will provide a more simple arrangement in situ to the structure 200, 210, 220 to be dampened.

Figure 24A:
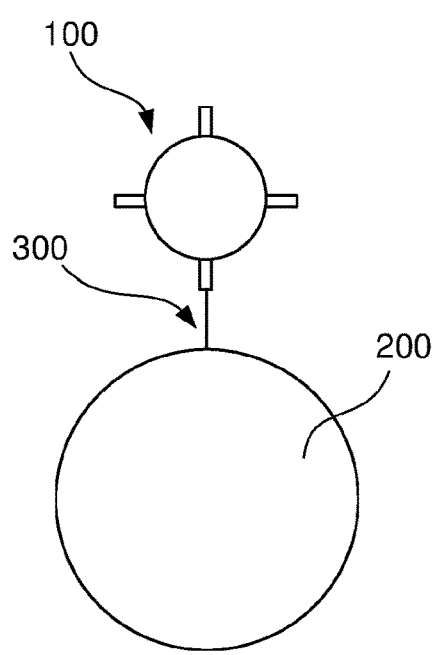
FIG. 24a-c are principle drawings of several vibration damper assemblies arranged around a structure.
Figure 24B:
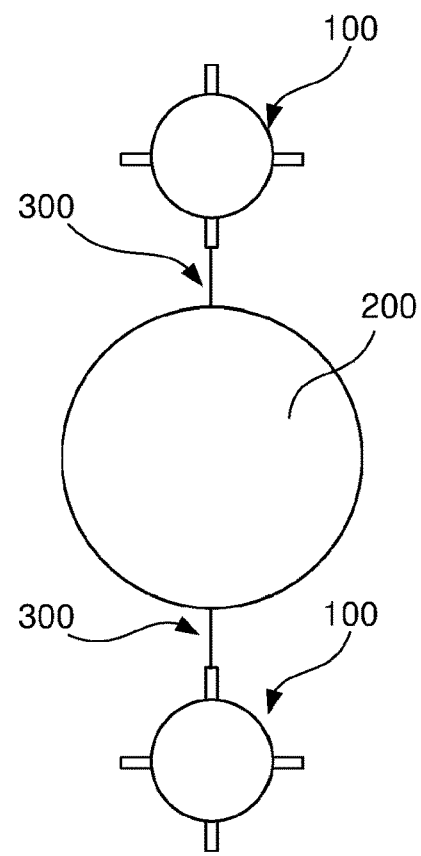
Figure 24C:
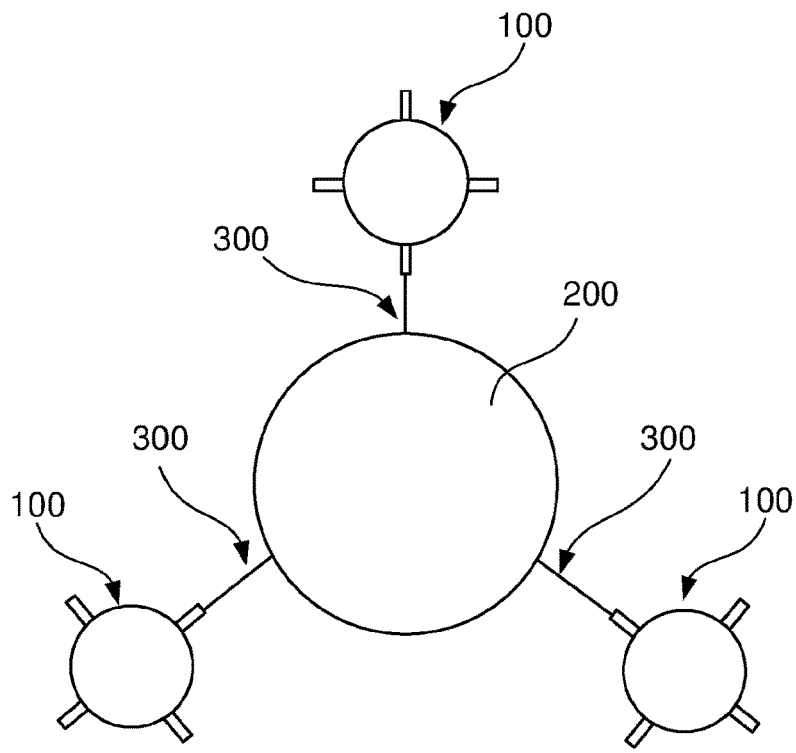

Reference is now made to FIGS. 24*a-c* which are principle drawings of the arrangement of several vibration damper assemblies 100 to the same structure 200, 210, 220. In FIG. 24*a* is shown the embodiment as described above with one vibration damper assembly 100 arranged to the structure 200, 210, 220 by means of a vibration damper support structure 300. In FIG. 24*b* is shown an embodiment where two vibration damper assemblies 100 are arranged to the same structure 200, 210, 220 by means of vibration damper support structures 300, where the vibration damper assemblies 100 are arranged at opposite sides of the structure 200, 210, 220. In FIG. 24*b* is shown an embodiment where three vibration damper assemblies 100 are arranged around the circumference of the same structure 200, 210, 220 by means of vibration damper support structures 300, wherein the vibration damper assemblies 100 are distributed along the circumference of the structure 200, 210, 220, in the example positioned with approximately 120 degrees between each other.

Figure 25A:
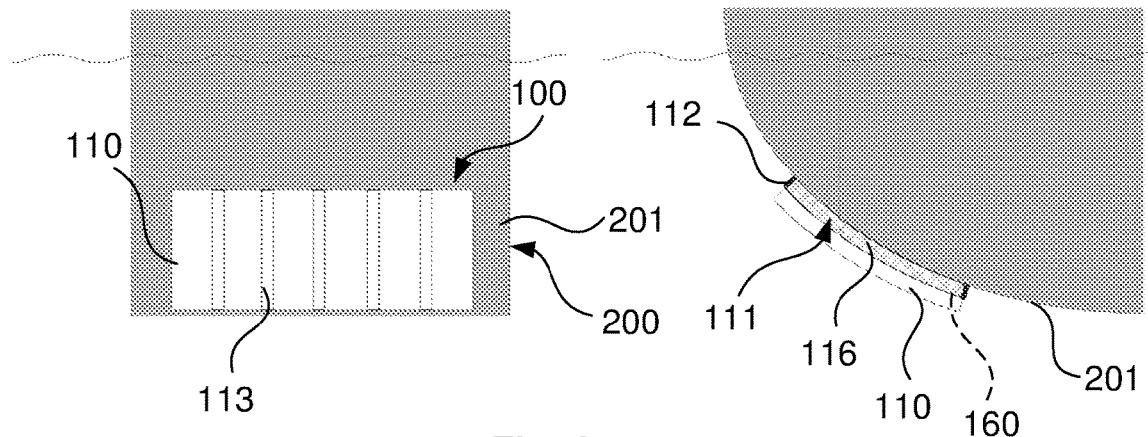
FIG. 25a-b are principle drawings of further embodiment of the disclosed vibration damper assembly.
Figure 25B:
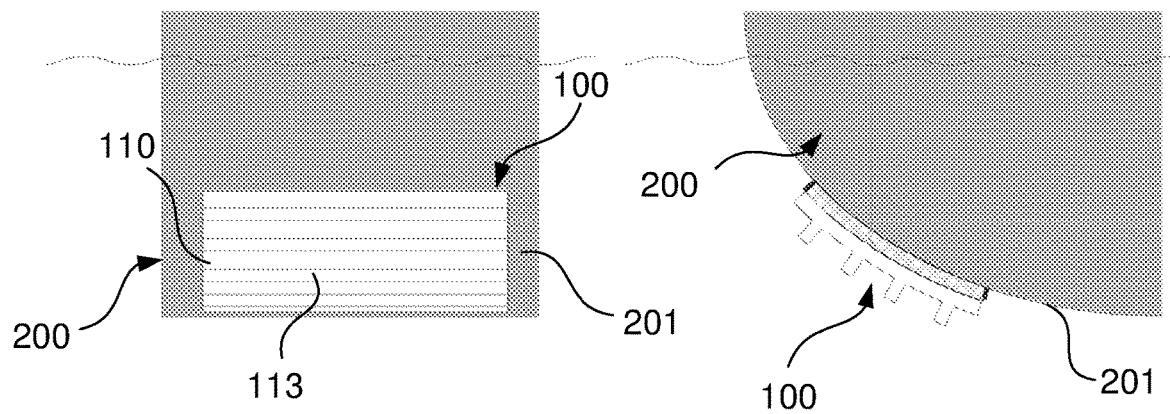

Reference is now made to FIGS. 25*a-b* which are principle drawings of a further embodiment of vibration damper assembly 100. In this embodiment, the outer cover 110 is provided with fins 113 extending in longitudinal direction of the structure 200 or in vertical direction of the structure 200. The fins 113 are not limited to shown embodiments and can extend in both vertical and horizontal direction, as well as exhibit other shapes or patterns as discussed above. In this embodiment, exterior surface 201 of the structure 200 will work as an inner restriction for the vibration damper assembly 100, and wherein the outer cover 110 exhibit a shape corresponding to the exterior surface 201 of the structure 200. The outer cover 110 is further provided with seals 112 at ends thereof, sealing against the exterior surface 201 of the structure 200 and providing a sealed damper volume 111 between the exterior surface 201 of the structure and the outer cover 110 that is separated from the water, which can be filled with a viscous fluid 116. The seals 112 can e.g. be rubber bellows, sleeves, gaskets, seals or similar, but can also be more sophisticated/advanced mechanical solutions, which will be apparent for a skilled person. The seals 112 can further be arranged to fix the vibration damper assembly 100 to the exterior surface 201 of the structure or the outer cover 110 can be arranged to the exterior surface 201 of the structure 200 by suitable fastening means (not shown). Accordingly, this embodiment of the vibration damper assembly 100 provides a solution where the vibration damper assembly 100 can be used as cover, coating or cladding of the exterior surface 201 of the structure 200. In an alternative embodiment the vibration damper assembly 100 comprises a container 160 between the outer cover 110 and the exterior surface 201 of the structure 200 for holding the viscous fluid 116, wherein the container 160 exhibit an inner shape corresponding to the exterior surface 201 of the structure 200 and outer shape corresponding to the inner shape of the outer cover 110. By fixing the outer cover 110 to the container 160 and the container 160 to the exterior surface 201 of the structure 200, the vibration damper assembly 100 can be arranged to the structure 200. It should be noted that also this embodiment can make use of the above described alternatives for the vibration damper assembly 100.

The above described embodiments of the vibration damper assembly 100 can be combined to form other modified embodiments within the scope of the attached claims.

The vibration damper assembly 100 can be used for all types of semi-submerged or submerged structures 200, 210, 220, 300, as shown in the Figures and discussed through the specification, which can have problems with vibration underwater. The size of the structure 200, 210, 220, 300 is not limiting the design, neither are the amplitudes of the vibration or the operational frequency.

The vibration damper assembly 100 is especially suitable for semi-submerged or submerged elongated mainly tubular structures 200, 210, 220, 300, such as elongated pipes in the form of drilling risers, where operation can be stopped during certain periods of the year due to high underwater currents. The addition of the described vibration damper assembly 100 on parts of or the full length of the riser can both reduce VIV forcing with an outer anti-VIV geometry and resonant vibration from external and internal forces (flow induced vibration (FIV), wave loads etc.) with the tuned mass damper effect of the vibration damper assembly 100.

Another pipe example which the vibration damper assembly 100 is suitable for are jumpers and flexloops. Jumpers and flexloops are flexible pipelines connecting the wellhead to a manifold and will have to be flexible to enable connection and to accommodate tolerances due to well growth, thermal expansion, position inaccuracy, etc. Jumpers and flexloops are known to have FIV problems due to high forcing from well flow that can be mitigated with the vibration damper assembly 100.

Other elongated subsea piping can be subjected to both FIV, VIV and flow induced pulsation (FLIP). Vibration from all forcing, as mentioned above, can be mitigated with the vibration damper assembly 100.

Other applications which the vibration damper assembly 100 is suitable for are structural members for submerged or semi-submerged structures 200, 210, 220, 300, such as support structures for offshore platforms or wind turbines, where the minimum amount of material is desired, but where structural integrity due to both dynamic and static loads are vital. The addition of the vibration damper assembly 100 will reduce dynamic loads from waves, winds, currents etc., similar to the reduction of vibration of pipelines as earlier described. Reducing the effects of dynamic loads to a wind turbine will also provide for a more power efficient operation of the wind turbine since the variation of pitch may be reduced, hence the wind turbine will be have less movement in relation to the wind direction.

Figure 27:
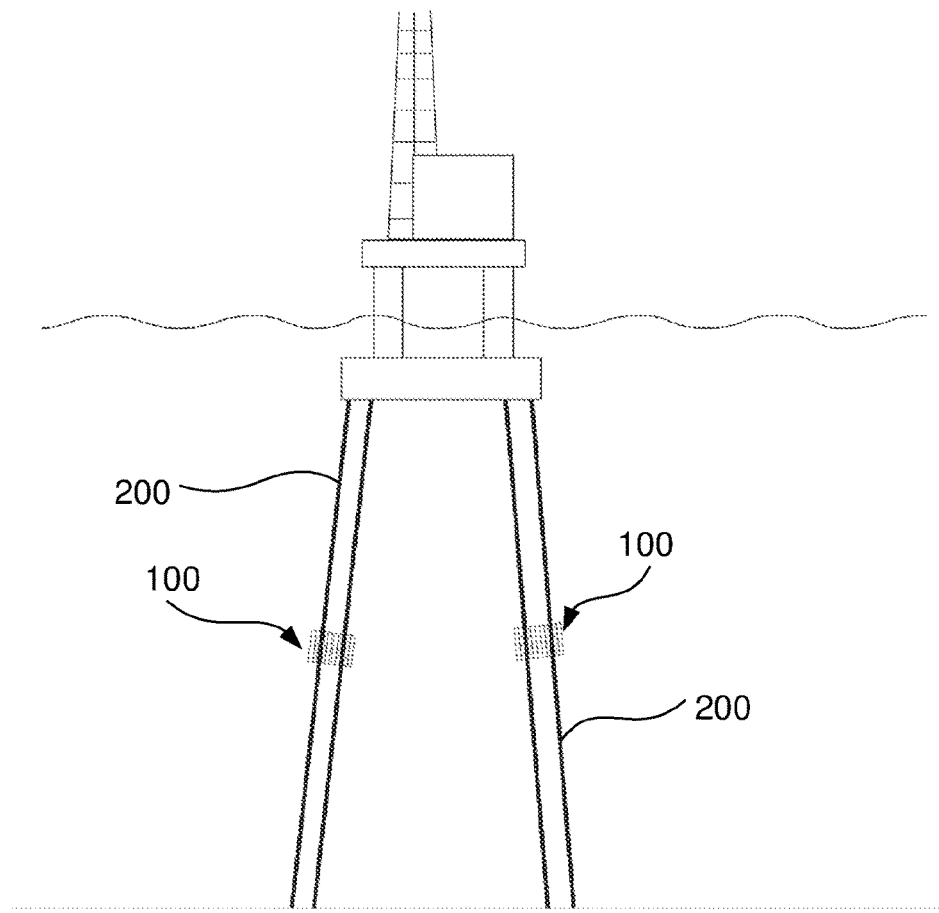
Figure 28:
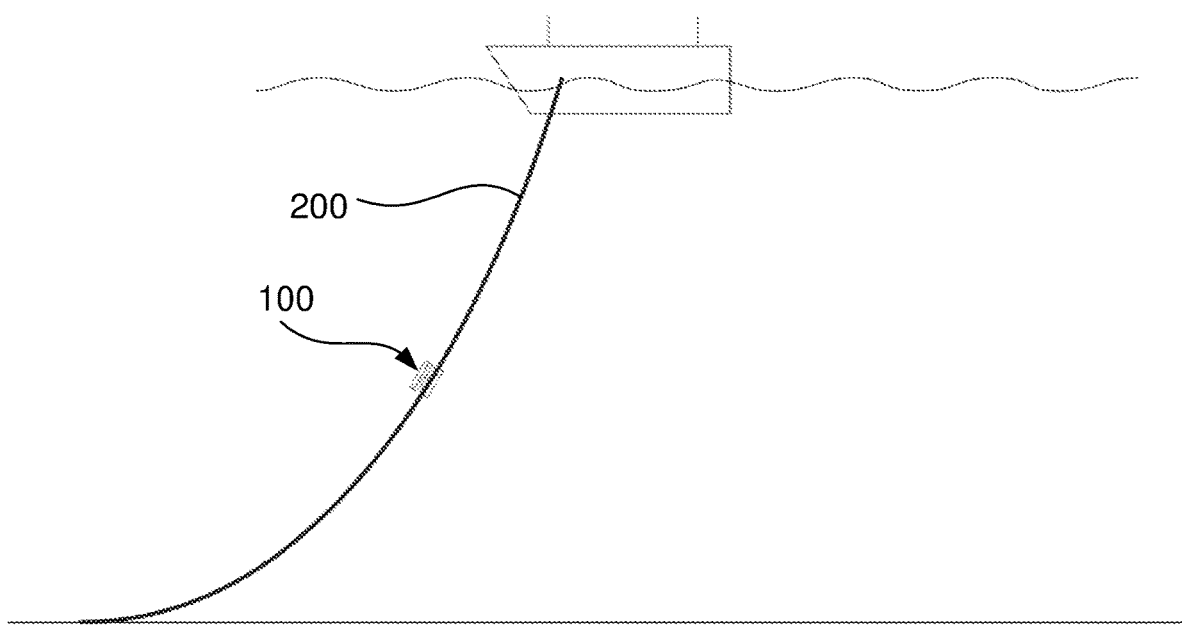

Other structures that will benefit from the use of the disclosed embodiments are umbilicals, fresh water supply, sea cables, tension legs (see FIG. 27) and mooring lines (see FIG. 28) (cables, wires, chains), as well as all kinds of transport pipes or tubes (for oil and gas, water, fish meal, etc.).

Accordingly, the inventive embodiments will be applicable for all submerged or semi-submerged structures requiring dampening of vibrations.

The hydrodynamic added mass can be activated by means of the vibration damper assembly being provided with an actuator for being used as an active vibration damper assembly. This can be achieved by that the vibration damper assembly is arranged to a surface or side of the structure, extension of the structure, support structure for the structure or vibration damper support structure instead of enclosing it entirely as described for some embodiments above. Alternatively, this can be achieved by designing the outer cover such that it has different hydrodynamic mass in different directions and thus achieve different damping properties to meet different eigenfrequencies the structure, extension of the structure, support structure for the structure or vibration damper support structure must have. In a further alternative, this is achieved by using friction disks for adding damping.

The invention claimed is:

1. A method for vibration damping of a semi-submerged or submerged structure (200, 210, 220, 300), comprising:
separating hydrodynamic added mass ($m_{add}$) from the semi-submerged or submerged structure (200, 210, 220, 300) by arranging an outer cover (110) of a vibration damper assembly (100) partly or entirely enclosing and being offset from the semi-submerged or submerged structure (200, 210, 220, 300) and using seals (112) at ends of the outer cover (110) to provide a sealed damper volume (111) for the vibration damper assembly (100) that is between the outer cover (110) and structure (200, 210, 220, 300) and that is separated from water surrounding the structure (200, 210, 220, 300), the sealed damper volume (111) exhibiting spring properties or damper properties or both, and
using the separated hydrodynamic added mass ($m_{add}$) as a reaction mass for the spring properties or damper properties or both in the vibration damper assembly (100).

2. The method according to claim 1, comprising separating the hydrodynamic added mass ($m_{add}$) via arranging an outer cover (110) to enclose at least part of the structure (200, 210, 220, 300) and providing a damper volume (111) between the outer cover (110) and structure (200).

3. The method according to claim 2, comprising providing a damping coefficient for the vibration damper assembly (100) by sealing the damper volume (111) and arranging a viscous fluid (116) in the damper volume (111).

4. The method according to claim 2, comprising providing a damping coefficient for the vibration damper assembly (100) by arranging a magnet or magnet assembly (117) and plates (118) at each side of the magnet or magnet assembly (117) in the damper volume (111), wherein the magnet or magnet assembly (117) and plates (118) are arranged to the outer cover (110) and structure (200, 210, 220, 300), respectively, or vice versa, thereby providing an alternating magnetic field.

5. The method according to claim 2, comprising providing a damping coefficient for the vibration damper assembly (100) by one of:
arranging annular spacers (130) with sliding surfaces (131), sealing the damper volume (111) and arranging an incompressible fluid in the damper volume (111), and
arranging annular spacers (130) with sliding surfaces (131) at each end of the outer cover (110), and arranging a magnet or magnet assembly (117) and plates (118) at each side of the magnet or magnet assembly (117) in the damper volume (111), arranged to the outer cover (110) and structure (200, 210, 220, 300), respectively, or vice versa, thereby providing an alternating magnetic field.

6. The method according to claim 2, comprising providing a stiffness coefficient for the vibration damper assembly (100) by arranging fastening means (119) extending between an inner circumference of the outer cover (110) and outer circumference of the structure (200, 210, 220, 300).

7. The method according to claim 2, comprising providing a stiffness coefficient for the vibration damper assembly (100) by using elastic seals (112) at ends of the outer cover (110).

8. The method according to claim 2, comprising providing a stiffness coefficient for the vibration damper assembly (100) by arranging one or more springs or spring assemblies (120) in the damper volume (111) extending between outer surface of the structure (200, 210, 220, 300) and inner surface of the outer cover (110).

9. The method according to claim 2, comprising introducing stiffness or damping or both in series with the at least one spring element (112, 119, 120) or damping element (116, 117-118) or both by using an outer cover (110) of a rigid or flexible material.

10. The method according to claim 1, comprising arranging several vibration damper assemblies (100) to each other in longitudinal direction of the structure (200, 210, 220, 300) separated by annular spacers (130) with sliding surfaces (131) with high or low friction to provide a damper coefficient.

11. A vibration damper assembly (100) for a semi-submerged or submerged structure (200, 210, 220, 300), comprising
an outer cover (110) arranged to partly or entirely enclose the structure (200, 210, 220, 300) while being offset from the structure (200, 210, 220, 300) separating hydrodynamic added mass ($m_{add}$) from the semi-submerged or submerged structure (200, 210, 220, 300), the outer cover (110) comprising seals (112) at ends thereof sealing against the structure (200, 210, 220, 300) and forming a sealed damper volume (111) between the outer cover (110) and the structure (200, 210, 220, 300) that is separated from water surrounding the structure (200, 210, 220, 300); and
at least one spring element (112, 119, 120) or damper element (116, 117-118) or both arranged for separating hydrodynamic added mass ($m_{add}$) from the semi-submerged or submerged structure (200, 210, 220, 300) and utilizing the separated hydrodynamic added mass ($m_{add}$) as reaction mass in the vibration damper assembly (100).

12. The vibration damper assembly (100) according to claim 11, comprising an outer cover (110) arranged to at least partly enclose the structure (200, 210, 220, 300) and form a damper volume (111) between the outer cover (110) and the structure (200, 210, 220, 300).

13. The vibration damper assembly (100) according to claim 12, wherein the outer cover (110) is provided with seals (112) at ends thereof sealing against the structure (200, 210, 220, 300).

14. The vibration damper assembly (100) according to claim 13, wherein the seals (112) are formed by an elastic material.

15. The vibration damper assembly (100) according to claim 12, wherein the at least one damper element (116) is formed by a viscous liquid layer (116) arranged in the damper volume (111).

16. The vibration damper assembly (100) according to claim 12, wherein the at least one damper element is formed by at least one magnet or magnet assembly (117) and plates (118) arranged at each side of the at least one magnet or magnet assembly (117) in the damper volume (111), wherein the magnet or magnet assembly (117) and plates (118) are arranged to the outer cover (110) and structure (200, 210, 220, 300), respectively, or vice versa.

17. The vibration damper assembly (100) according to claim 12, comprising
annular spacers (130) with sliding surfaces (131) with high friction arranged to each side of the outer cover (110), wherein an incompressible fluid is arranged in the damper volume (111), or
annular spacers (130) with sliding surfaces (131) with low friction arranged to each side of the outer cover (110) wherein a magnet or magnet assembly (117) and plates (118) are arranged at each side of the magnet or magnet assembly (117) in the damper volume (111), arranged to the outer cover (110) and structure (200, 210, 220, 300), respectively, or vice versa, thereby providing an alternating magnetic field.

18. The vibration damper assembly (100) according to claim 17, further comprising an inner layer or longitudinal spacers (132) arranged between the viscous layer (116) and the structure (200, 210, 220, 300).

19. The vibration damper assembly (100) according to claim 12, further comprising fastening means (119) extending between an inner circumference of the outer cover (110) and an outer circumference of the structure (200, 210, 220, 300).

20. The vibration damper assembly (100) according to claim 12, further comprising one or more springs or spring assemblies (120) arranged in the damper volume (111), extending between outer circumference of the structure (200, 210, 220, 300) and inner circumference of the outer cover (110).

21. The vibration damper assembly (100) according claim 12, wherein the outer cover (110) is formed by a rigid or flexible material introducing stiffness or damping or both in series with at least one spring element (112, 119, 120) or damping element (116, 117-118) or both.

22. The vibration damper assembly (100) according to claim 11, wherein the several vibration damper assemblies (100) are arranged to each other in longitudinal direction of the structure (200, 210, 220, 300) separated by annular spacers (130) provided with sliding surfaces (131) with high or low friction.

23. The vibration damper assembly (100) according to claim 11, wherein the vibration damper assembly (100) is divided in segments (100a) provided with means (140) for mutual connection.

24. A vibration damper assembly (100) for a semi-submerged or submerged structure (200, 210, 220, 300), comprising at least one spring element (112, 119, 120) or damper element (116, 117-118) or both arranged for separating hydrodynamic added mass ($m_{add}$) from the semi-submerged or submerged structure (200, 210, 220, 300) and utilizing the separated hydrodynamic added mass ($m_{add}$) as reaction mass in the vibration damper assembly (100), and an outer cover (110) arranged to at least partly enclose the structure (200, 210, 220, 300) and form a damper volume (111) between the outer cover (110) and the structure (200, 210, 220, 300) while being offset from the structure (200, 210, 220, 300), wherein the outer cover (110) at an outer surface thereof is formed by or provided with one or more from the group consisting of fins (113), grids (114) and spacers (115).

\* \* \* \* \*